(12) United States Patent
Shinohara

(10) Patent No.: US 9,013,809 B2
(45) Date of Patent: *Apr. 21, 2015

(54) IMAGE CAPTURING LENS AND IMAGE CAPTURING APPARATUS PROVIDED WITH THE IMAGE CAPTURING LENS

(71) Applicant: FUJIFILM Corporation, Tokyo (JP)

(72) Inventor: Yoshikazu Shinohara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,220

(22) Filed: Jul. 2, 2014

(65) Prior Publication Data

US 2014/0313597 A1    Oct. 23, 2014

Related U.S. Application Data

(60) Division of application No. 14/062,913, filed on Oct. 25, 2013, now Pat. No. 8,810,923, which is a continuation of application No. PCT/JP2012/003822, filed on Jun. 12, 2012.

(30) Foreign Application Priority Data

Jul. 25, 2011   (JP) .................................. 2011-161507
Jun. 11, 2012  (JP) .................................. 2012-131656

(51) Int. Cl.
    *G02B 13/18*    (2006.01)
    *G02B 9/60*    (2006.01)
    (Continued)

(52) U.S. Cl.
    CPC .............. *G02B 3/04* (2013.01); *G02B 13/0045* (2013.01); *G02B 13/18* (2013.01); *G02B 9/60* (2013.01)

(58) Field of Classification Search
    CPC ....... G02B 13/0045; G02B 13/18; G02B 9/60
    USPC ......................................... 359/714, 763, 764
    See application file for complete search history.

(56) References Cited

U.S. PATENT DOCUMENTS 7,502,181 B2   3/2009   Shinohara
7,911,711 B1   3/2011   Tang et al.
(Continued)

FOREIGN PATENT DOCUMENTS

JP         59-121016      7/1984
JP         63-274904    11/1988
(Continued)

OTHER PUBLICATIONS

International Search Report, PCT/JP2012/003822 dated Aug. 21, 2012, with English translation.
(Continued)

*Primary Examiner* — Scott J Sugarman
(74) *Attorney, Agent, or Firm* — Young & Thompson

(57) ABSTRACT

An image capturing lens which substantially consists of five lenses, composed of a first aspherical lens having a convex surface on the object side and a positive refractive power; a second aspherical lens having a concave surface on the image side and a negative refractive power; a third aspherical lens having a positive refractive power near the optical axis; a fourth aspherical lens having a negative refractive power; and a fifth aspherical lens which is a meniscus lens having a concave surface on the image side and a negative refractive power, arranged in this order from the object side, and satisfies predetermined conditional expressions.

7 Claims, 21 Drawing Sheets

(51) Int. Cl.
   *G02B 3/04* (2006.01)
   *G02B 13/00* (2006.01)

(56) References Cited

U.S. PATENT DOCUMENTS

| | | |
|---|---|---|
| 2007/0229984 A1 | 10/2007 | Shinohara |
| 2011/0310494 A1* | 12/2011 | Ise et al. ................. 359/714 |
| 2013/0201568 A1 | 8/2013 | Tsai et al. |
| 2013/0229718 A1 | 9/2013 | Tsai et al. |
| 2013/0314803 A1 | 11/2013 | Huang et al. |
| 2014/0139935 A1* | 5/2014 | Hsieh et al. ................. 359/764 |

FOREIGN PATENT DOCUMENTS

| | | |
|---|---|---|
| JP | 2007-264180 | 10/2007 |
| JP | 2007-298572 | 11/2007 |
| JP | 2010-256608 | 11/2010 |
| JP | 2011-085733 | 4/2011 |

OTHER PUBLICATIONS

Written Opinion of the International Searching Authority PCT/JP2012/003822 dated Aug. 21, 2012.

* cited by examiner

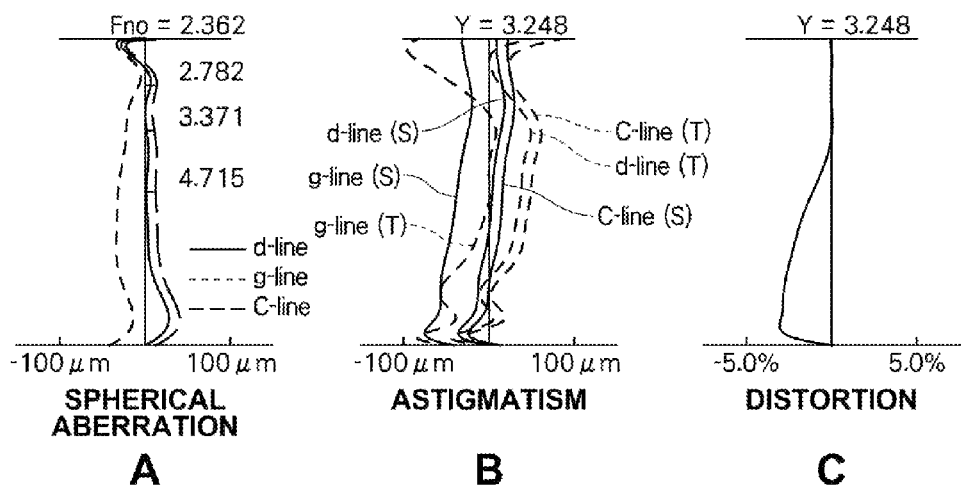
FIG.14 EXAMPLE 1
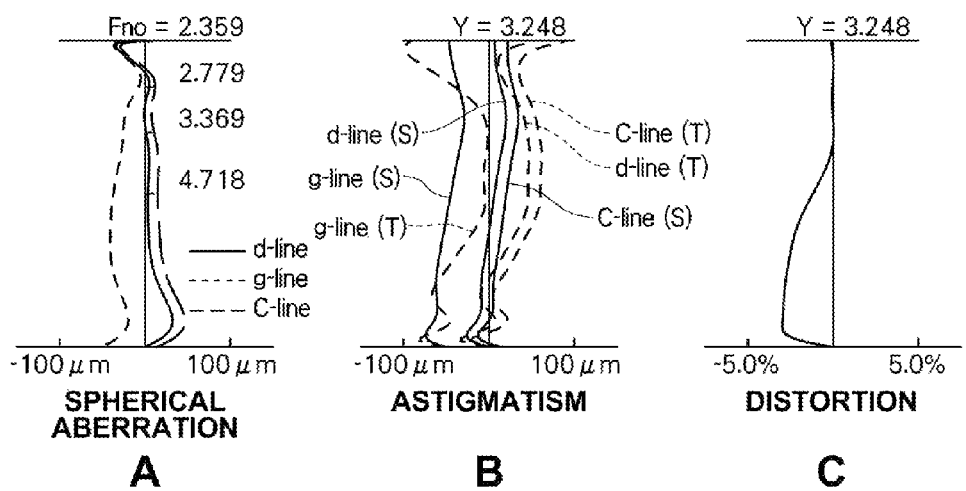
FIG.15 EXAMPLE 2

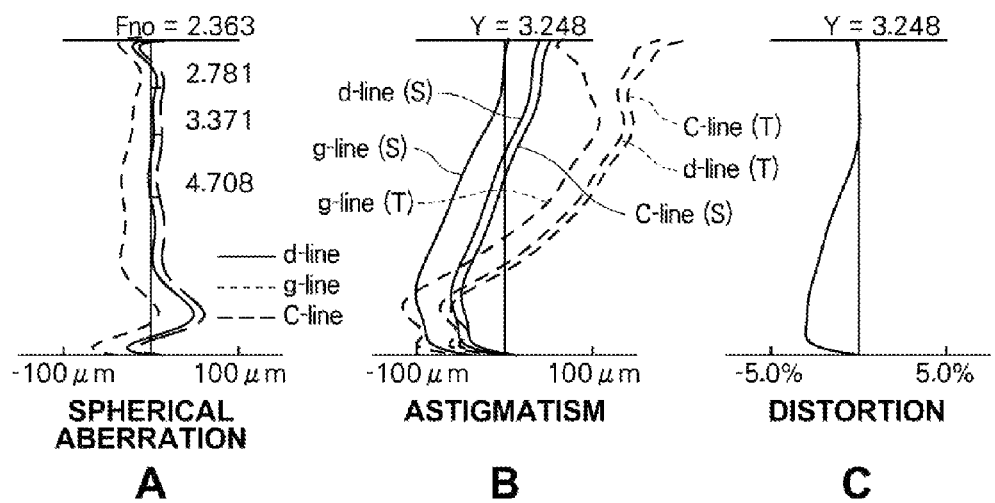
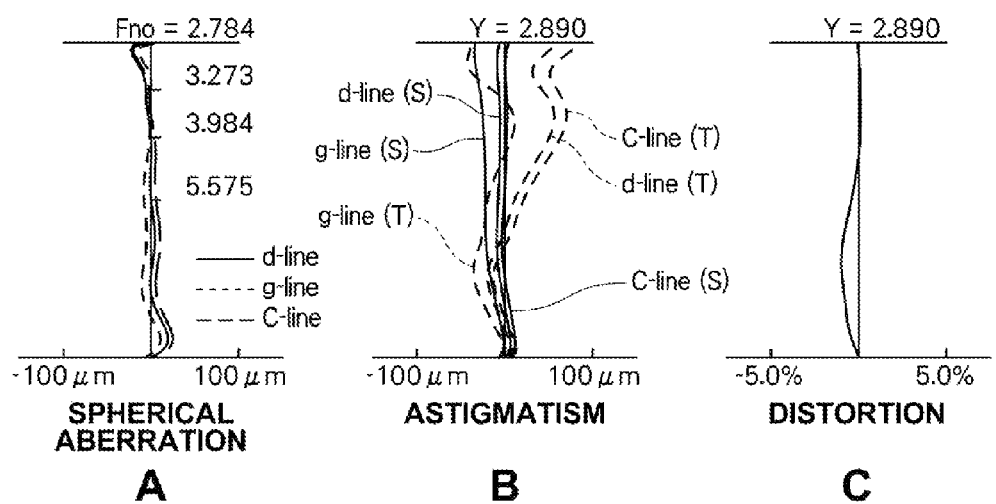

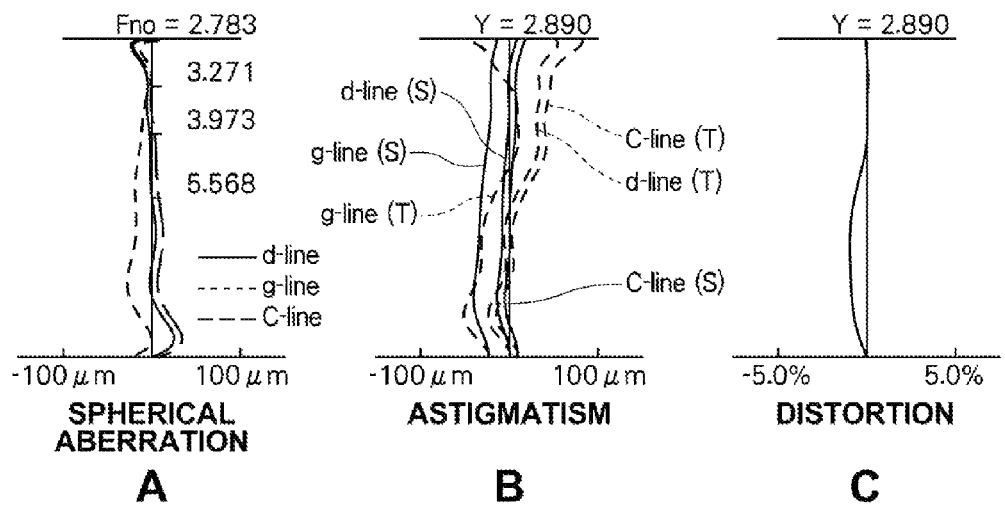
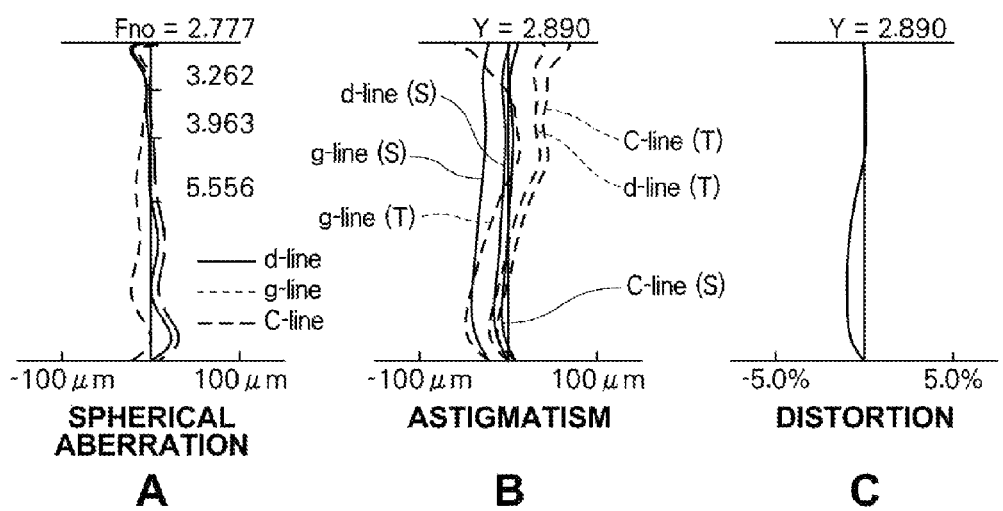

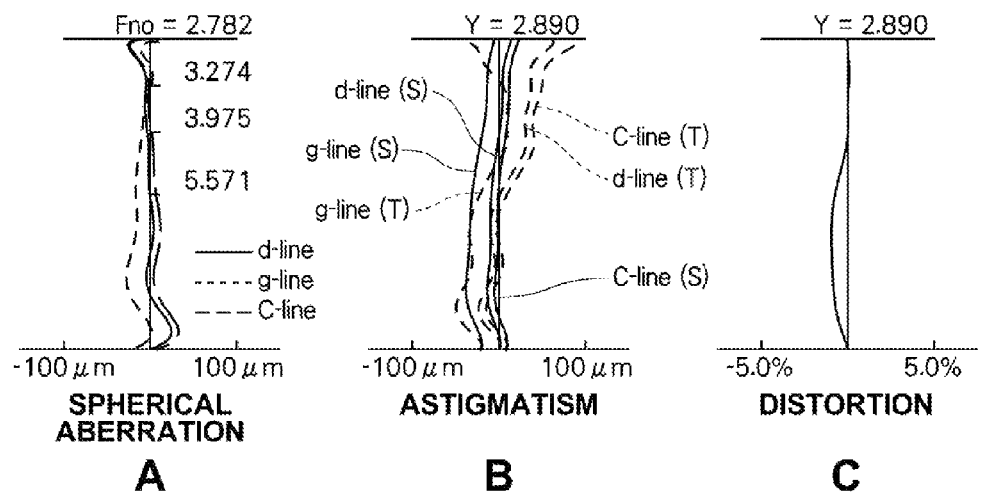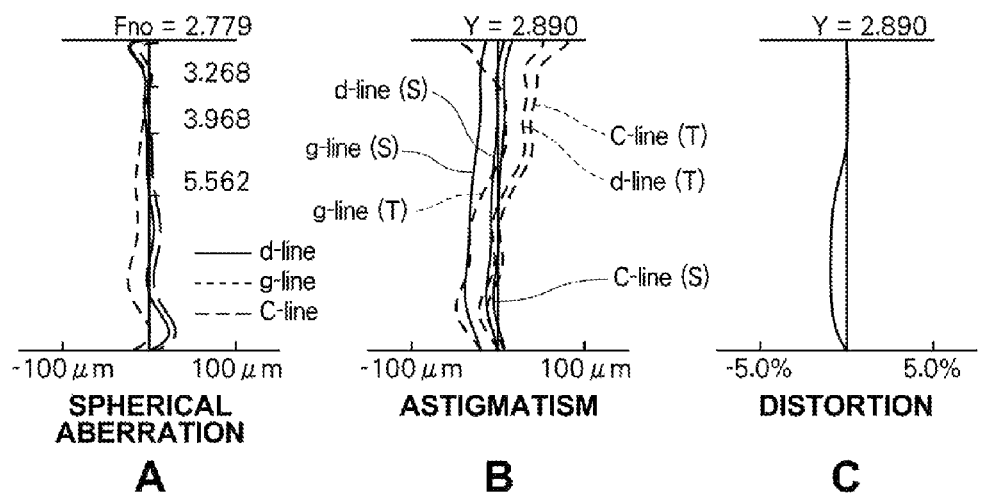

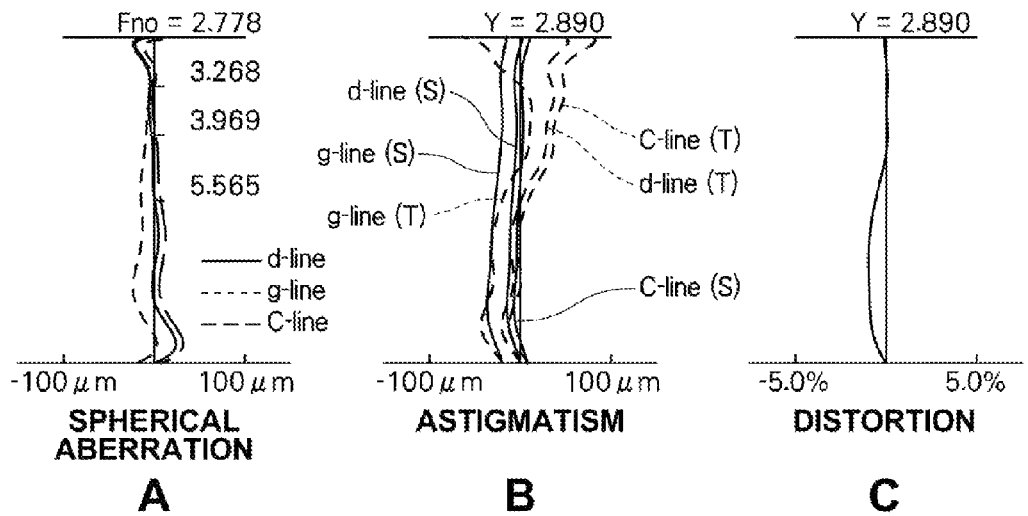
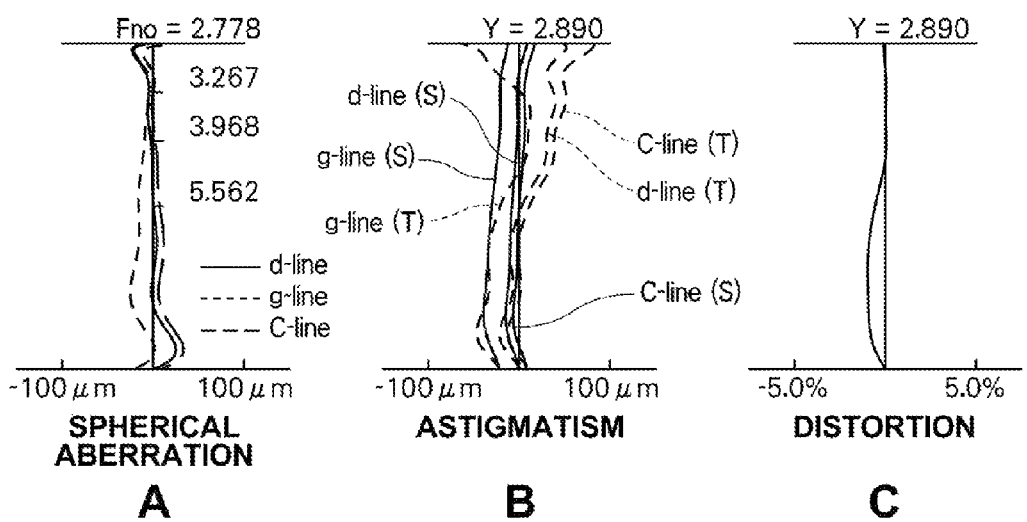

IMAGE CAPTURING LENS AND IMAGE CAPTURING APPARATUS PROVIDED WITH THE IMAGE CAPTURING LENS

TECHNICAL FIELD

The present invention relates to an image capturing lens for forming an optical image of a subject on an image sensor, such as a CCD (Charge Coupled Device), CMOS (Complementary Metal Oxide Semiconductor), or the like, and an image capturing apparatus having the image capturing lens mounted thereon to perform image capturing, such as a digital still camera, camera-equipped cell phone, smartphone, tablet terminal, personal digital assistance (PDA), or the like.

BACKGROUND ART

Recently, along with the spread of personal computers to homes, and the like, digital still cameras capable of inputting image information obtained by imaging a landscape, person, or the like to a personal computer have been spreading rapidly. In addition, more and more cell phones have built-in camera modules for inputting images. Such devices with image capturing capabilities employ image sensors such as CCDs, CMOSs, and the like. Recently, these types of image sensors have been downsized greatly and, consequently, image capturing devices as a whole and image capturing lenses to be mounted on such devices have also been required to have more compact sizes. At the same time, the pixel count of image sensors has been increasing, thereby causing a growing demand for improvement of image capturing lenses in resolution and performance. For example, performance corresponding to high pixel counts, such as more than 2 mega pixels (MP) and more preferably more than 5 MP, is demanded.

For such demands, it is conceivable to employ a five-lens configuration having a relatively large number of lenses in order, for example, to achieve the reduction in overall length and the improvement in the resolution (refer to U.S. Patent Application Publication No. 20070229984, Japanese Unexamined Patent Publication No. 2007-298572, Japanese Unexamined Patent Publication No. 2010-256608, Japanese Unexamined Patent Publication No. 2011-085733, and U.S. Pat. No. 7,911,911).

DISCLOSURE OF THE INVENTION

The five-element lens described in U.S. Patent Application Publication No. 20070229984 or Japanese Unexamined Patent Publication No. 2007-298572, however, requires more satisfactory correction in longitudinal chromatic aberration. The image capturing lens described in Japanese Unexamined Patent Publication No. 2010-256608 or Japanese Unexamined Patent Publication No. 2011-085733 requires further reduction in overall length. The image capturing lens described in U.S. Pat. No. 7,911,911 has a large ratio of overall length relative to the size of image sensor, and when applied to an image sensor of a size that meets the demand of higher pixel count by extending proportionally, the overall length becomes long, so that the overall length needs to be further reduced after all.

The present invention has been developed in view of the circumstances described above and it is an object of the present invention to provide an image capturing lens well corrected, in particular, in longitudinal chromatic aberration and chromatic aberration in a peripheral region of the image forming area, thereby capable of realizing high image forming performance from the central angle of view to the peripheral angle of view with reduced overall length. It is a further object of the present invention to provide an image capturing apparatus with the image capturing lens mounted thereon and capable of capturing a high resolution image.

An image capturing lens of the present invention is an image capturing lens substantially consisting of five lenses, composed of:

a first lens having a convex surface on the object side near the optical axis and a positive refractive power near the optical axis with an aspherical shape on at least one surface;

a second lens having a concave surface on the image side near the optical axis and a negative refractive power near the optical axis with an aspherical shape on at least one surface;

a third lens having a positive refractive power near the optical axis with an aspherical shape on at least one surface;

a fourth lens having a negative refractive power near the optical axis with an aspherical shape on at least one surface; and a fifth lens which is a meniscus lens having a concave surface on the image side near the optical axis and a negative refractive power near the optical axis with an aspherical shape on at least one surface, arranged in this order from the object side, wherein the image capturing lens is configured to satisfy conditional expressions given below:

$$2 < f3/f1 < 20 \qquad (2);$$

$$1.10 < |f4/f5| \qquad (3); \text{ and}$$

$$vd4 < 35 \qquad (4),$$

where, f1 is a focal length of the first lens;
f3 is a focal length of the third lens;
f4 is a focal length of the fourth lens;
f5 is a focal length of the fifth lens; and
vd4 is an Abbe number of the fourth lens with respect to the d-line.

The term "substantially consisting of five lenses" as used herein refers to that the image capturing lens of the present invention includes a lens substantially without any power, an optical element other than a lens, such as an aperture stop, cover glass, or the like, a lens flange, a lens barrel, an image sensor, and a mechanism, such as a camera-shake correction mechanism or the like, other than the five lenses.

According to the image capturing lens of the present invention, the structure of each lens element is optimized in a lens configuration of five lenses in total. This allows the realization of a lens system well corrected, in particular, in longitudinal chromatic aberration and chromatic aberration in a peripheral region of the image forming area, and has high image forming performance from the central to peripheral angles of view, while the overall length is reduced. Particularly, the image capturing lens is configured such that the focal lengths of the first and third lenses satisfy the expression (2), so that the powers of the first and third lenses can be balanced and the performance in the central and peripheral regions of the image forming area is maintained satisfactorily, while the overall length is reduced. Further, the image capturing lens is configured such that the focal lengths of the fourth and fifth lenses satisfy the expression (3), so that the strength of the negative refractive power of the fourth lens becomes appropriate, and the field curvature and lateral chromatic aberration caused by the fifth lens can be maintained within a well correctable range. Still further, the image capturing lens is configured such that the fourth lens satisfies the expression (4), so that the longitudinal chromatic aberration and lateral chromatic aberration in the peripheral region of the image forming area are corrected satisfactorily, while the overall length is reduced.

In the image capturing lens of the present invention, further adoption and satisfaction of the following preferable configurations may further improve the optical performance.

Preferably, the image capturing lens of the present invention satisfies the conditional expression (1) given below. Satisfaction of the conditional expression (1) with respect to the second lens may reduce the Abbe number vd2 and increase dispersion, whereby the longitudinal chromatic aberration is corrected satisfactorily and the resolution in the central region of the image forming area is maintained. In order to further enhance the advantageous effect, it is more preferable that the image capturing lens satisfies the conditional expression (1-1).

$$vd2<35 \tag{1}$$

$$vd2<30 \tag{1-1}$$

where, vd2 is an Abbe number of the second lens with respect to the d-line.

Preferably, the image capturing lens of the present invention satisfies the conditional expression (2-1) given below. Satisfaction of the conditional expression (2-1) with respect to the first and third lenses allows the powers of the first and third lenses to be balanced more satisfactorily, whereby the performance in the central and peripheral regions of the image forming area is maintained more satisfactorily, while the overall length is reduced.

$$2.2<f3/f1<20 \tag{2-1}$$

Preferably, the image capturing lens of the present invention satisfies the conditional expression (3-1) given below. Satisfaction of the conditional expression (3-1) with respect to the focal lengths of the fourth and fifth lenses allows the strength of the power of the fourth lens to become more appropriate, whereby the field curvature and lateral chromatic aberration caused by the fifth lens can be maintained within a well correctable range more satisfactorily.

$$1.1<|f4/f5|<50 \tag{3-1}$$

Preferably, the image capturing lens of the present invention satisfies the conditional expression (4-1) given below. Satisfaction of the conditional expression (4-1) with respect to the fourth lens allows the longitudinal chromatic aberration and lateral chromatic aberration in the peripheral region of the image forming area are corrected more satisfactorily, while the overall length reduction is realized more satisfactorily.

$$vd4<30 \tag{4-1}$$

Preferably, the image capturing lens of the present invention includes an aperture stop disposed on the object side of the first lens. This allows a larger distance to be set between the image forming plane and the exit pupil relative to the overall length, whereby the incident angle on the image sensor is reduced and higher optical performance is realized.

The image capturing apparatus of the present invention is an image capturing apparatus provided with the image capturing lens of the present invention.

According to the image capturing apparatus of the present invention, a high resolution image signal may be obtained based on a high resolution optical image obtained by the image capturing lens of the present invention.

According to the image capturing lens of the present invention, the structure of each lens element is optimized in a lens configuration of five lenses in total. The image capturing lens is configured, in particular, such that the dispersion of the fourth lens becomes appropriate in addition to the appropriate setting of ratios between the focal lengths of the third and first lenses and between the focal lengths of the fourth and fifth lenses. This allows the realization of a lens system well corrected, in particular, in the longitudinal chromatic dispersion and has high image forming performance from the central to peripheral angles of view, while the overall length is reduced.

Further, according to the image capturing apparatus of the present invention, an image capturing signal is outputted according to an optical image formed by the high performance image capturing lens of the present invention described above, so that a high resolution image may be captured based on the image capturing signal.

BRIEF DESCRIPTION OF DRAWINGS

FIG. 14 shows aberration diagrams illustrating various types of aberrations of an image capturing lens according to Example 1 of the present invention, in which A illustrates spherical aberration, B illustrates astigmatism (field curvature), and C illustrates distortion.

FIG. 15 shows aberration diagrams illustrating various types of aberrations of an image capturing lens according to Example 2 of the present invention, in which A illustrates spherical aberration, B illustrates astigmatism (field curvature), and C illustrates distortion.

FIG. 16 shows aberration diagrams illustrating various types of aberrations of an image capturing lens according to Example 3 of the present invention, in which A illustrates spherical aberration, B illustrates astigmatism (field curvature), and C illustrates distortion.

FIG. 17 shows aberration diagrams illustrating various types of aberrations of an image capturing lens according to Reference Example 4 of the present invention, in which A illustrates spherical aberration, B illustrates astigmatism (field curvature), and C illustrates distortion.

FIG. 20 shows aberration diagrams illustrating various types of aberrations of an image capturing lens according to Example 7 of the present invention, in which A illustrates spherical aberration, B illustrates astigmatism (field curvature), and C illustrates distortion.

FIG. 21 shows aberration diagrams illustrating various types of aberrations of an image capturing lens according to Example 8 of the present invention, in which A illustrates spherical aberration, B illustrates astigmatism (field curvature), and C illustrates distortion.

FIG. 22 shows aberration diagrams illustrating various types of aberrations of an image capturing lens according to Example 9 of the present invention, in which A illustrates spherical aberration, B illustrates astigmatism (field curvature), and C illustrates distortion.

FIG. 23 shows aberration diagrams illustrating various types of aberrations of an image capturing lens according to Example 10 of the present invention, in which A illustrates spherical aberration, B illustrates astigmatism (field curvature), and C illustrates distortion.

FIG. 24 shows aberration diagrams illustrating various types of aberrations of an image capturing lens according to Example 11 of the present invention, in which A illustrates spherical aberration, B illustrates astigmatism (field curvature), and C illustrates distortion.

FIG. 25 shows aberration diagrams illustrating various types of aberrations of an image capturing lens according to Example 12 of the present invention, in which A illustrates spherical aberration, B illustrates astigmatism (field curvature), and C illustrates distortion.

BEST MODE FOR CARRYING OUT THE INVENTION

Hereinafter, embodiments of the present invention will be described in detail with reference to the accompanying drawings.

Figure 1:
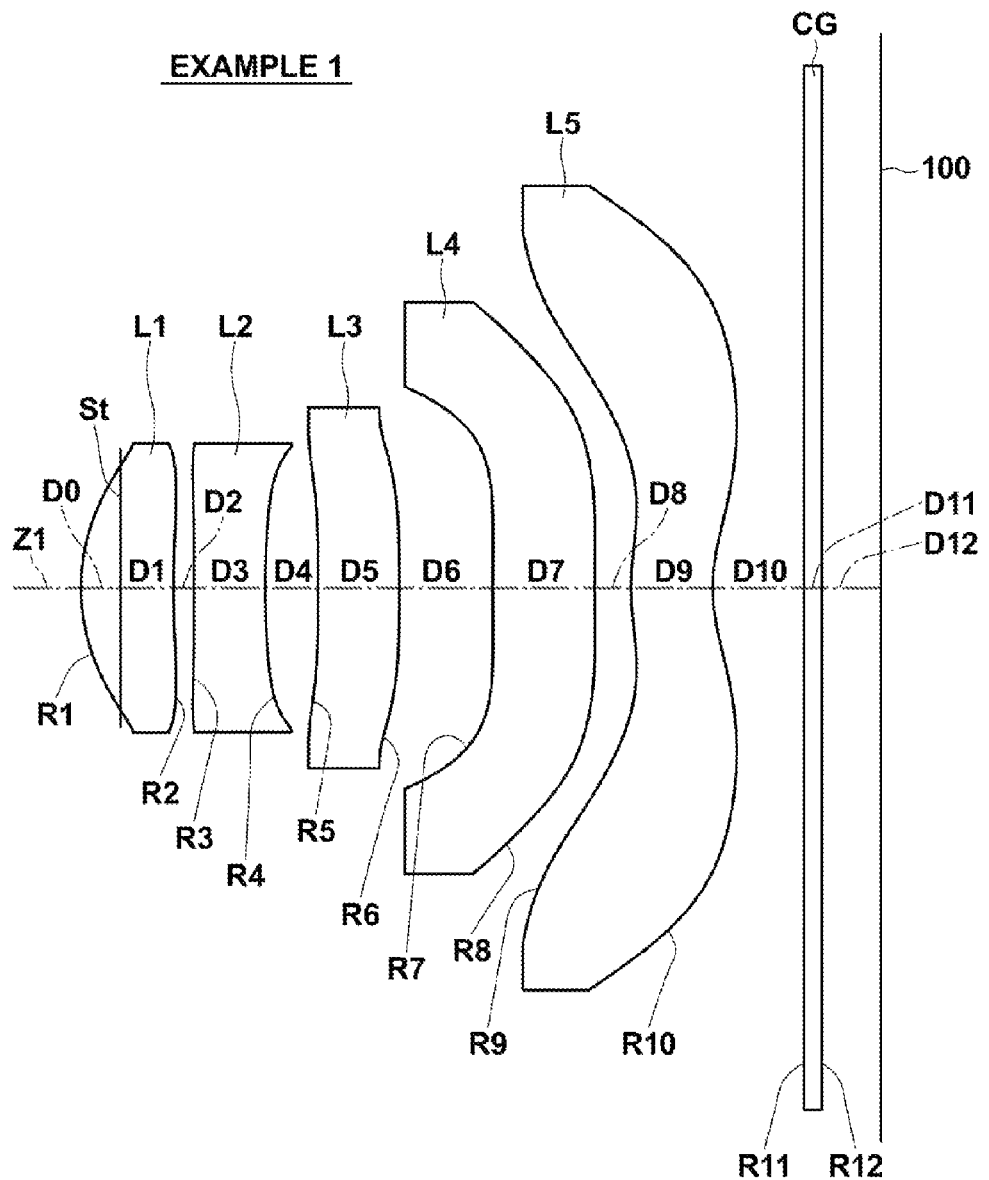
FIG. 1 illustrates a first configuration example of the image capturing lens according to an embodiment of the present invention, which is a cross-sectional view of a lens corresponding to Example 1.
Figure 2:
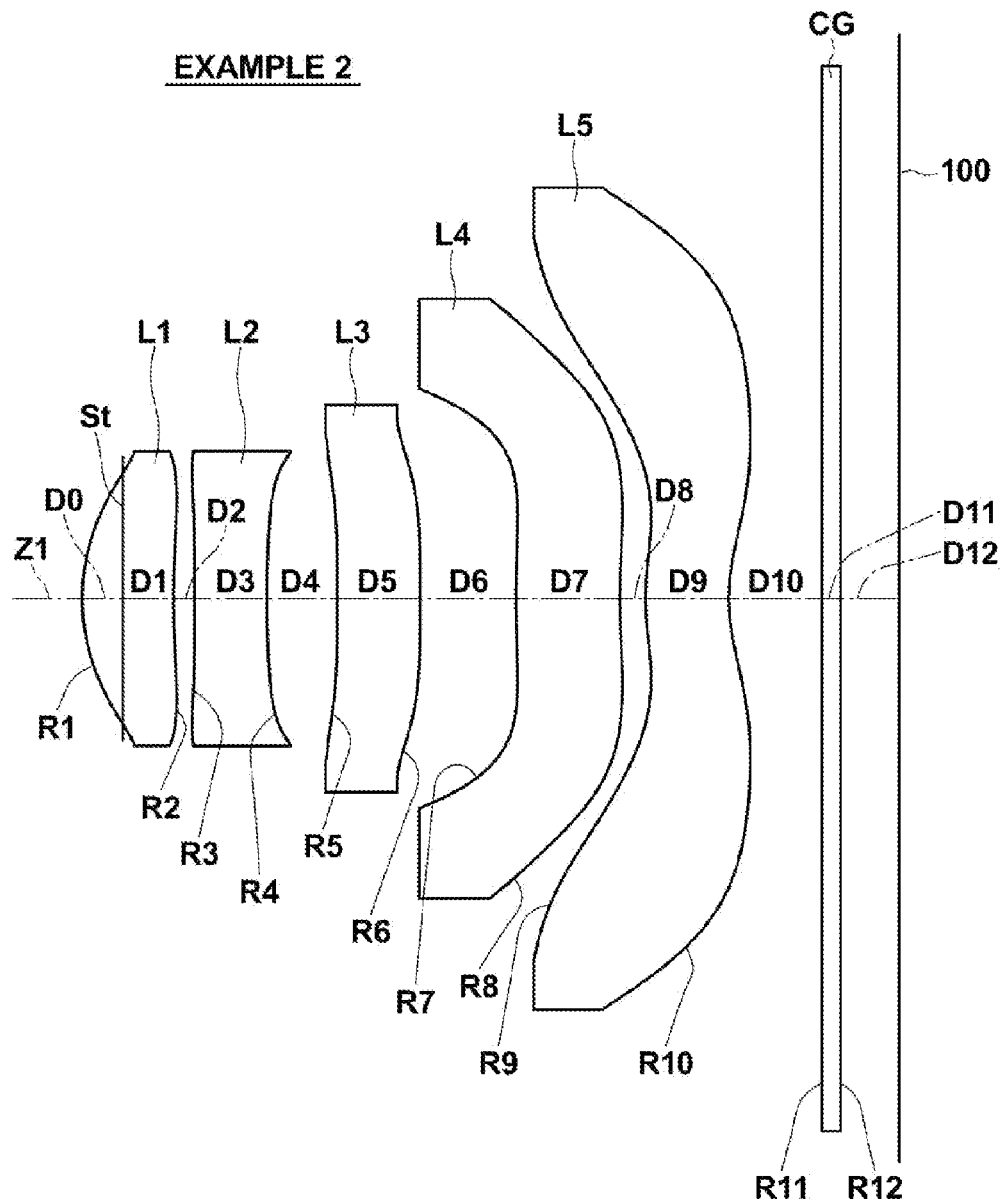
FIG. 2 illustrates a second configuration example of the image capturing lens according to an embodiment of the present invention, which is a cross-sectional view of a lens corresponding to Example 2.
Figure 3:
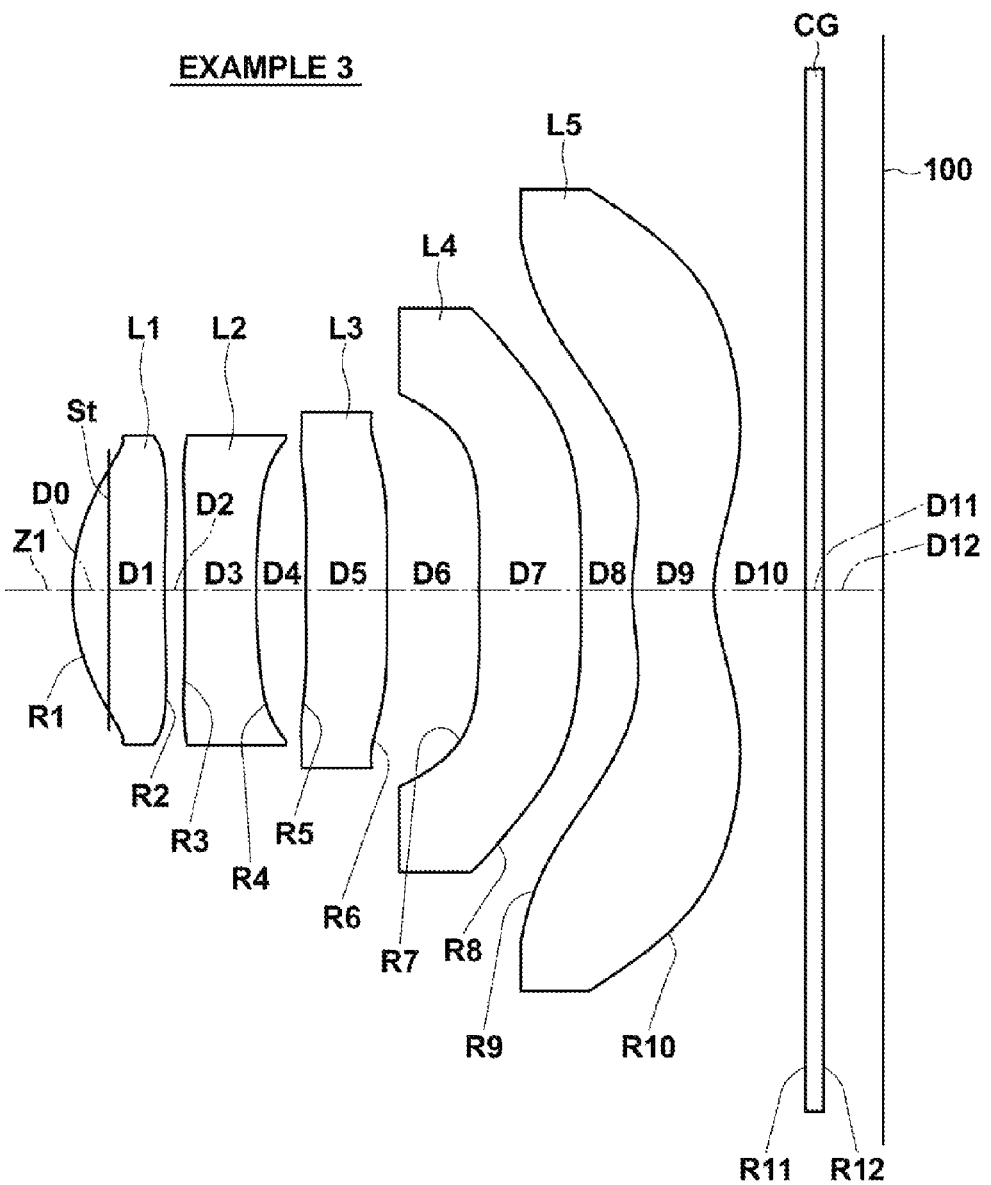
FIG. 3 illustrates a third configuration example of the image capturing lens according to an embodiment of the present invention, which is a cross-sectional view of a lens corresponding to Example 3.

FIG. 1 illustrates a first configuration example of the image capturing lens according to an embodiment of the present invention. This configuration example corresponds to the lens configuration of a first numerical example (Table 1, Table 14) to be described later. Likewise, the second and third configuration examples corresponding to the lens configurations of the second and third numerical examples (Tables 2 to 3 and Tables 15 to 16) to be described later are illustrated in FIGS. 2 and 3 respectively. Further, the sixth to thirteenth configuration examples corresponding to the lens configurations of the sixth to thirteenth numerical examples (Tables 6 to 13 and Tables 19 to 26) are illustrated in FIGS. 6 to 13 respectively. In addition, the configurations of fourth and fifth reference examples (Tables 4, 5 and Tables 17, 18) are illustrated in cross-section, in FIGS. 4, 5 respectively. In FIGS. 1 to 13, the symbol Ri represents a radius of curvature of $i^{th}$ surface, which is sequentially increased toward the image side (image forming side) with the most object side lens element surface being taken as the first surface. The symbol Di represents a surface distance between the $i^{th}$ surface and $(i+1)^{th}$ surface on the optical axis Z1. As basic configuration is the same in each configuration example, the description will be made hereinafter based on the configuration example illustrated in FIG. 1 and configuration examples of FIGS. 2 to 3 and FIGS. 6 to 13 will be described as required.

An image capturing lens L according to the present embodiment is suitably applied to various types of image capturing devices that use an image sensor, such as CCD or CMOS. It is particularly useful for relatively small portable terminal devices, such as digital still cameras, camera-equipped cell phones, smartphones, tablet terminals, PDAs, and the like. The image capturing lens L has a first lens L1, a second lens L2, a third lens L3, a fourth lens L4, and a fifth lens L5 arranged in this order from the object side along the optical axis Z1.

Figure 27:
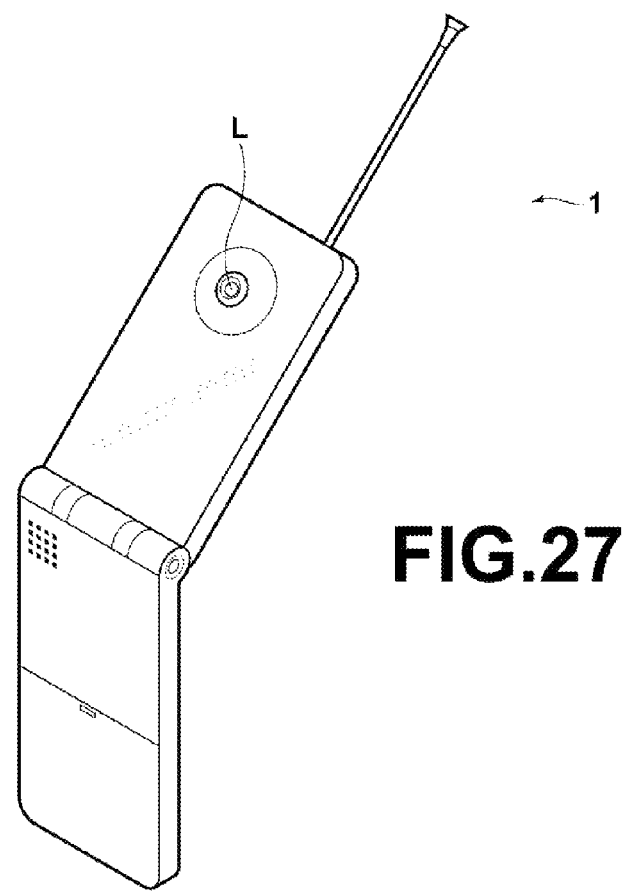
FIG. 27 illustrates an image capturing apparatus which is a cell phone terminal provided with the image capturing lens of the present invention.

FIG. 27 illustrates an overview of a cell phone terminal which is an image capturing apparatus 1 according to the present embodiment. The image capturing apparatus 1 according to the present embodiment includes the image capturing lens L according to the present embodiment and an image sensor 100 (FIG. 1) such as a CCD that outputs image capturing signal according to an optical image formed by the image capturing lens L. The image sensor 100 is disposed on the image forming surface (image capturing surface) of the image capturing lens L.

Figure 28:
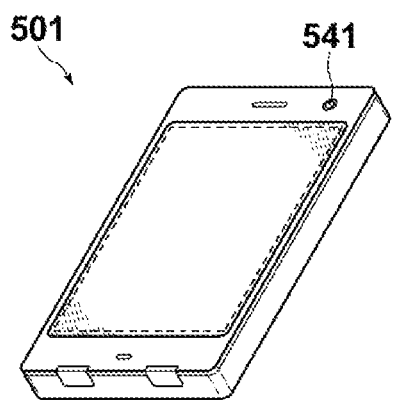
FIG. 28 illustrates an image capturing apparatus which is a smartphone terminal provided with the image capturing lens of the present invention.

FIG. 28 illustrates an overview of a smartphone which is an image capturing apparatus 501 according to an embodiment of the present invention. The image capturing apparatus 501 includes a camera section 541 having the image capturing lens L according to the present embodiment and an image sensor 100 (FIG. 1) such as a CCD that outputs image capturing signal according to an optical image formed by the image capturing lens L. The image sensor 100 is disposed on the image forming surface (image capturing surface) of the image capturing lens L.

Various types of optical members CG may be disposed between the fifth lens L5 and image sensor 100 according to the structure on the camera side to which the lens is mounted. For example, a plate-like optical member, such as a cover glass for protecting the image capturing surface or an infrared cut filter may be disposed. In this case, for example, a plate-like cover glass with a coating applied thereon having a filtering effect, such as an infrared cut filter or ND filter, may be used as the optical member CG.

Further, the optical member CG may be omitted and the fifth lens L5 may be provided with a coating to have an effect identical to that of the CG. This may contribute to the reduction in the number of components used and reduction in overall length.

The image capturing lens L also has an aperture stop St. The aperture stop St is an optical aperture stop and is preferable to be disposed before or after the first lens L1. For example, the aperture stop St is preferable to be a so-called "front aperture stop" in which the aperture stop is disposed on the most object side. The term "front aperture stop" as used herein refers to that the aperture stop is disposed, in an optical axis direction, at a position corresponding to the intersection point between the axial marginal ray and object side surface of the first lens L1 or on the object side of the intersection point. In the present embodiment, lenses of the first to third configuration examples and lenses of the sixth to thirteenth configuration examples (FIGS. 1 to 3 and FIGS. 6 to 13) are configuration examples corresponding to the front aperture stop. Employment of the front aperture stop allows a longer distance to be set between the image forming surface and the pupil relative to the overall length, whereby the incident angle on the image sensor is reduced and higher optical performance is realized.

The image capturing lens L uses an aspherical surface on at least one surface of each of the first lens L1 to fifth lens L5 for performance improvement.

In the image capturing lens L, the first lens L1 has a positive refractive power near the optical axis. The first lens L1 has a convex lens on the object side near the optical axis. This allows the spherical aberration to be corrected easily.

The second lens L2 has a negative refractive power near the optical axis. The second lens L2 has a concave surface on the image side near the optical axis so that the field curvature may be corrected satisfactorily.

The third lens L3 has a positive refractive power near the optical axis.

The fourth lens has a negative refractive power near the optical axis. The "peripheral region" of the fourth lens L4 has a shape such that the tangent line to the image side surface intersects with the optical axis on the image side. The term "peripheral region" as used herein refers to a region outside of the area corresponding to 50% of the lens measured outwardly in a radial direction from the optical axis. In this way, by forming the fourth lens L4 such that the image side surface is concave toward the image side near the optical axis and the tangent line to the image side surface intersects with the optical axis on the image side in the peripheral region of the image side surface, the occurrence of longitudinal chromatic aberration and lateral chromatic aberration may be reduced. In particular, if the object side surface of the fourth lens L4 has a shape in the peripheral region such that the tangent line to the object side surface intersects with the optical axis on the image side, as well as the image side surface, the advantageous effect described above becomes more significant.

The fifth lens L5 is a meniscus lens having a negative refractive power near the optical axis. The fifth lens L5 has a concave surface on the image side near the optical axis. In this way, by forming the fifth lens L5 to have a concave surface on the image side, the field curvature may be corrected satisfactorily.

Each of the lenses L1 to L5 constituting the image capturing lens L is not a cemented lens but a single lens. This provides more aspherical surfaces in comparison with the case in which any of the lenses L1 to L5 is a cemented lens, resulting in higher design flexibility and the overall length may be reduced satisfactorily.

The function and advantageous effects of the image capturing lens L configured in the manner described above will now be described. In particular, the function and advantageous effects with respect to conditional expressions will be described in detail.

First, it is preferable that the Abbe number vd2 of the second lens L2 with respect to the d-line satisfies the conditional expression (1) given below.

$$vd2 < 35 \quad (1)$$

If the second lens L2 exceeds the upper limit of the conditional expression (1), the longitudinal chromatic aberration is increased and the resolution in the central region of the image forming area is degraded. Hence, by satisfying the conditional expression (1) with respect to the second lens L2 to reduce the Abbe number vd2 and increase dispersion as a negative lens, the longitudinal chromatic aberration may be corrected satisfactorily and the resolution in the central region of the image forming area may be maintained appropriately. From this point of view, it is more preferable that the conditional expression (1-1) is satisfied, and further preferable that the conditional expression (1-2) is satisfied.

$$vd2 < 30 \quad (1\text{-}1)$$

$$vd2 < 25 \quad (1\text{-}2)$$

The focal length f3 of the third lens and the focal length f1 of the first lens satisfy the conditional expression (2) given below.

$$2 < f3/f1 < 20 \quad (2)$$

If values of the focal length f3 of the third lens L3 and the focal length f1 of the first lens L1 are those that fall below the lower limit of the expression (2), the power of the first lens L1 becomes weak relative to the third lens L3 and the focal length f1 of the first lens L1 becomes large, so that the overall length of the lens becomes long. Hence, by arranging the values of the focal length f3 of the third lens L3 and focal length f1 of the first lens L1 to satisfy the lower limit of the expression (2), the powers of the first lens L1 and third lens L3 may be balanced such that the power of the first lens L1 does not become too weak relative to the power of the third lens L3 and the focal length f1 of the first lens L1 may be maintained within an appropriate range, whereby the overall length may be reduced satisfactorily. If values of the focal length f3 of the third lens L3 and the focal length f1 of the first lens L1 are those that exceed the upper limit of the expression (2), it becomes easier to reduce the overall length but the power of the first lens L1 becomes strong relative to the third lens L3 and the difference in optical performance between the peripheral region and central region of the image forming area becomes large, thereby resulting in degraded resolution in the peripheral region. Hence, by arranging the values of the focal length f3 of the third lens L3 and focal length f1 of the first lens L1 to satisfy the upper limit of the expression (2), the powers of the first lens L1 and third lens L3 may be balanced such that the power of the first lens L1 does not become too strong relative to the power of the third lens L3 and good optical performance may be realized over the entire range from the central to peripheral regions. From this point of view, it is more preferable that the conditional expression (2-1) is satisfied and further preferable that the conditional expression (2-2) is satisfied.

$$2.2 < f3/f1 < 20 \tag{2-1}$$

$$2.5 < f3/f1 < 12 \tag{2-2}$$

The focal length f4 of the fourth lens and focal length f5 of the fifth lens satisfy the conditional expression (3) given below.

$$1.10 < |f4/f5| \tag{3}$$

If the focal length f4 of the fourth lens L4 and focal length f5 of the fifth lens L5 fall below the lower limit of the expression (3), the negative refractive power of the fourth lens L4 becomes strong relative to the negative refractive power of the fifth lens L5 and it becomes difficult to satisfactorily correct the field curvature or lateral chromatic aberration of the fifth lens L5. Hence, by arranging the focal length f4 of the fourth lens L4 and focal length f5 of the fifth lens L5 to satisfy the lower limit of the expression (3), the powers of the fourth lens L4 and fifth lens L5 may be balanced such that the power of the fourth lens L4 does not become too strong relative to the power of the fifth lens L5 so that the field curvature or lateral chromatic aberration of the fifth lens L5 may be corrected satisfactorily. From this point of view, it is more preferable that the conditional expression (3-1) is satisfied and further preferable that the conditional expression (3-2) is satisfied. In an image capturing lens with a short overall length used for a cell phone or the like, in particular, the tendency that the incident angle on the image sensor is increased with an increase in the image height is significant. It is, therefore, preferable to control the incident angle with respect to the image sensor not to become too large from the central image height to peripheral image height, thereby preventing various problems, including degradation in the light receiving efficiency and color mixing, arising from increase in the incident angle with respect to the image sensor. If the upper limit of the conditional expression (3-1) given below is exceeded, it is difficult to sufficiently control the increase in the incident angle on the image sensor, in particular, at an intermediate image height. Hence, by satisfying the upper limit of the conditional expression (3-1), the incident angle on the image sensor may be satisfactorily controlled so as not to become too large at an intermediate image height. From this point of view, it is more preferable that the conditional expression (3-2) is satisfied.

$$1.1 < |f4/f5| < 50 \tag{3-1}$$

$$1.5 < |f4/f5| < 15 \tag{3-2}$$

The Abbe number of the fourth lens with respect to the d-line satisfies the conditional expression (4) given below.

$$vd4 < 35 \tag{4}$$

If the Abbe number vd4 of the fourth lens with respect to the d-line exceeds the upper limit of the conditional expression (4), it is difficult to maintain the performance of lateral chromatic aberration in the peripheral region of the image forming area while satisfactorily reducing the overall length. Hence, by satisfying the conditional expression (4) by the Abbe number vd4 of the fourth lens with respect to the d-line, the overall length may be reduced satisfactorily while the longitudinal chromatic aberration and lateral chromatic aberration may be improved. From this point of view, it is more preferable that the conditional expression (4-1) is satisfied and further preferable that the conditional expression (4-2) is satisfied.

$$vd4 < 30 \tag{4-1}$$

$$vd4 < 25 \tag{4-2}$$

As described above, according to the image capturing lens L of the present embodiment, the structure of each lens element is optimized in a lens configuration of five lenses in total. In particular, the lens L is configured such that the dispersion of the fourth lens becomes appropriate, and the ratios of the focal length between the first and third lenses and between the fourth and fifth lenses are set appropriately. This allows the realization of a lens system well corrected, in particular, in longitudinal chromatic aberration and has high image forming performance from the central to peripheral angles of view, while the overall length is reduced.

Further, the manufacturability of the lens L is improved by satisfying preferable conditions as appropriate and high image forming performance may be realized. Still further, according to the image capturing apparatus of the present embodiment, an image capturing signal is outputted according to an optical image formed by the high performance image capturing lens L of the present embodiment, so that a high resolution image may be captured.

Next, specific numerical examples of the image capturing lens according to the present embodiment will be described. Hereinafter, a plurality of numerical examples will be described collectively.

Tables 1 and 14, to be shown later, indicate specific lens data corresponding to the configuration of image capturing lens shown in FIG. 1, in which Table 1 mainly indicates basic lens data while Table 14 indicates data with respect to the aspherical surfaces. The column of surface number Si in the lens data shown in Table 1 indicates $i^{th}$ surface number of Example 1, which is sequentially increased toward the image side with the most object side lens element surface being taken as the first surface (the aperture stop St being taken as the $0^{th}$ surface). The column of radius of curvature Ri indicates the value of radius of curvature (mm) of $i^{th}$ surface from the object side, the symbol Ri being corresponding to the symbol Ri in FIG. 1. Likewise, the column of surface distance Di indicates the distance between $i^{th}$ surface Si and $(i+1)^{th}$ surface Si+1 on the optical axis (mm). The column of Ndj indicates the value of refractive index of $j^{th}$ optical element from the object side with respect to the d-line (587.56 nm). The column of vdj indicates the Abbe number of $j^{th}$ optical element with respect to the d-line.

In the image capturing lens according to Example 1, each of the first lens L1 to fifth lens L5 has an aspherical shape on both sides. In the basic lens data in Table 1, the values of radii of curvature near the optical axis (paraxial radii of curvature) are indicated as the radii of curvature of these aspherical surfaces. Table 14 indicates aspherical surface data of image capturing lens of Example 1. In the values indicated as the aspherical surface data, the symbol "E" represents that the subsequent value is a base-10 "exponent" and the numerical value preceding the symbol "E" is multiplied by the numerical value represented by the base-10 exponent function. For example, "1.0E-02" is "$1.0 \times 10^{-2}$".

As for the aspherical surface data, a value of each of coefficients Ai and K in the aspherical surface expression represented by the formula (A) given below is indicated. More specifically, Z is a length of a perpendicular line drawn from a point on the aspherical surface at a height h from the optical axis to a tangent plane to the apex of the aspherical surface (plane orthogonal to the optical axis) (mm).

$$Z = C \cdot h^2 / \{1 + (1 - K \cdot C^2 \cdot h^2)^{1/2}\} + \Sigma Ai \cdot h^i \quad (A)$$

where:
Z is the depth of an aspherical surface;
h is a distance (height) from the optical axis to the lens surface (mm);
C is a paraxial curvature (=1/R);
R is a paraxial radius of curvature;
Ai is an $i^{th}$ order (i is an integer greater than or equal to 3) aspherical surface coefficient; and
K is an aspherical surface coefficient.

Figure 4:
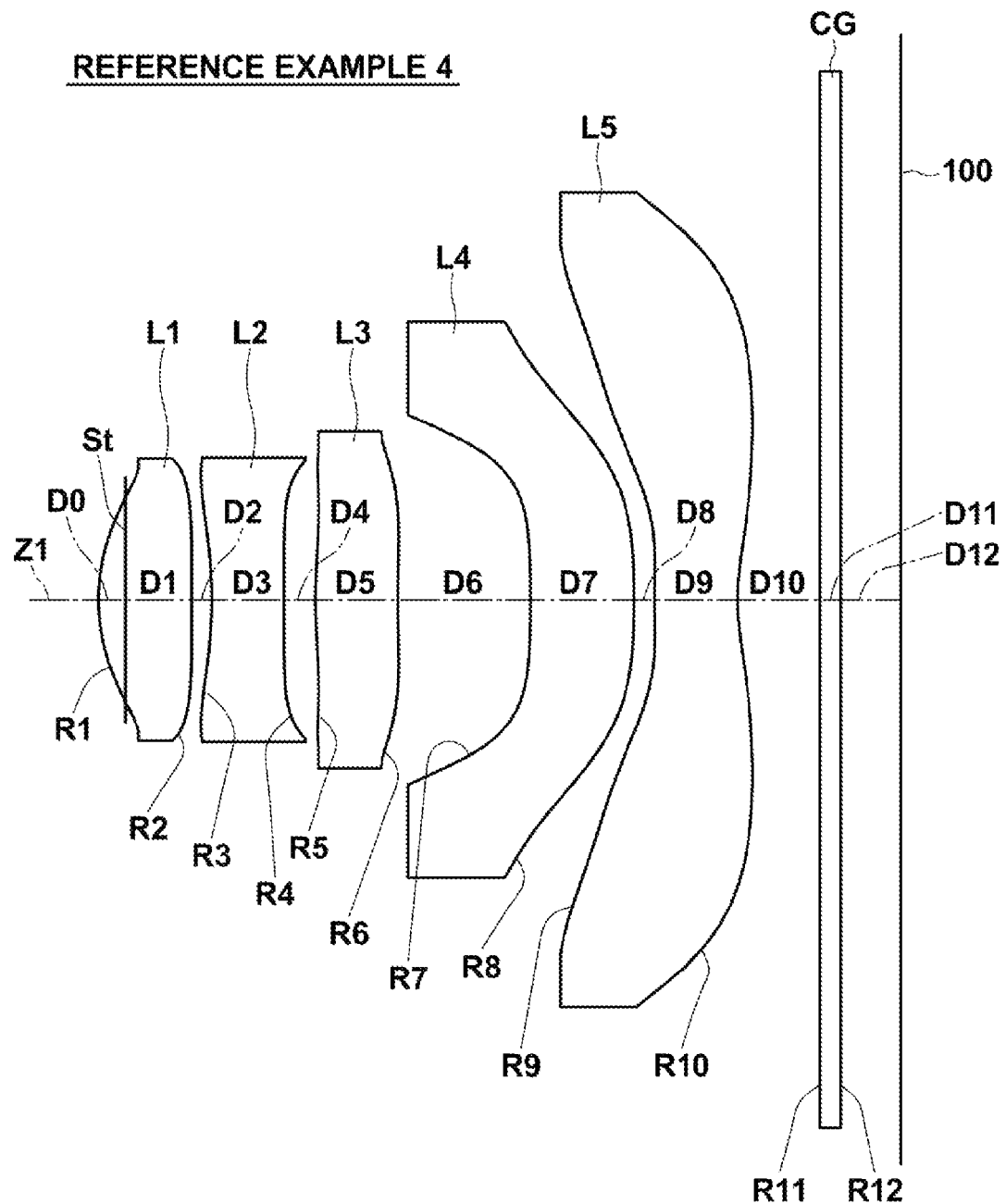
FIG. 4 illustrates a fourth configuration example of the image capturing lens according to an embodiment of the present invention, which is a cross-sectional view of a lens corresponding to Reference Example 4.
Figure 5:
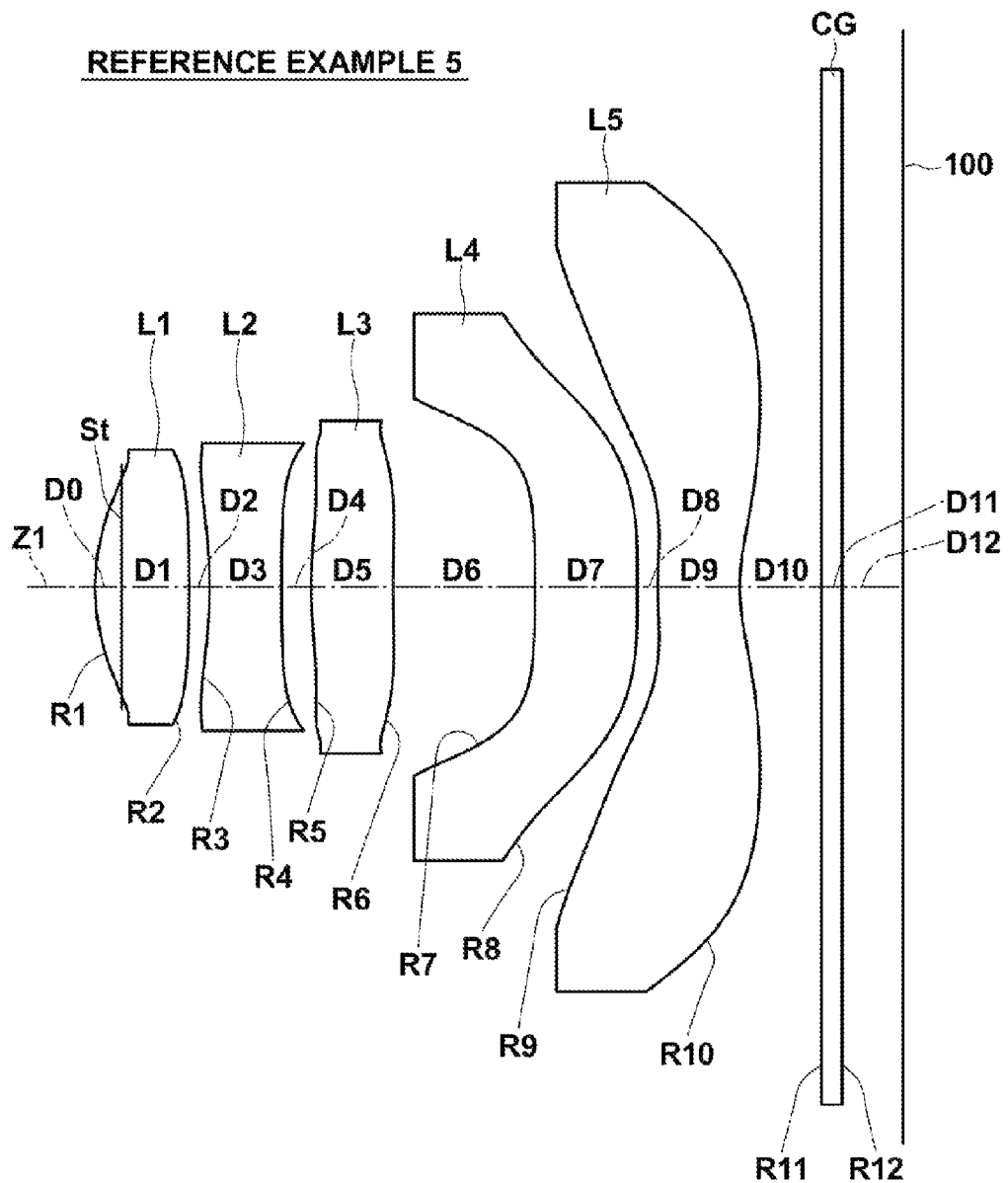
FIG. 5 illustrates a fifth configuration example of the image capturing lens according to an embodiment of the present invention, which is a cross-sectional view of a lens corresponding to Reference Example 5.
Figure 6:
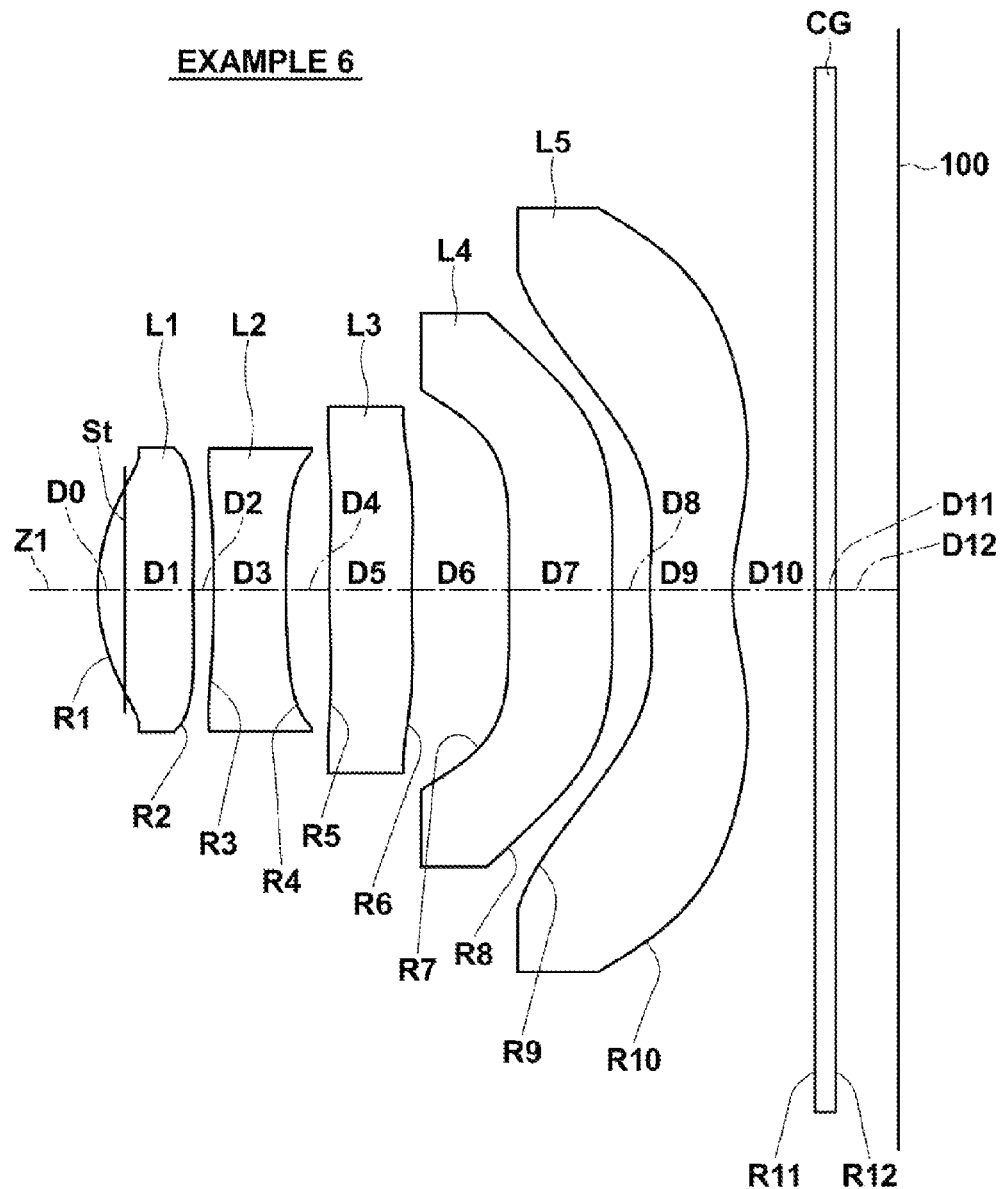
FIG. 6 illustrates a sixth configuration example of the image capturing lens according to an embodiment of the present invention, which is a cross-sectional view of a lens corresponding to Example 6.
Figure 7:
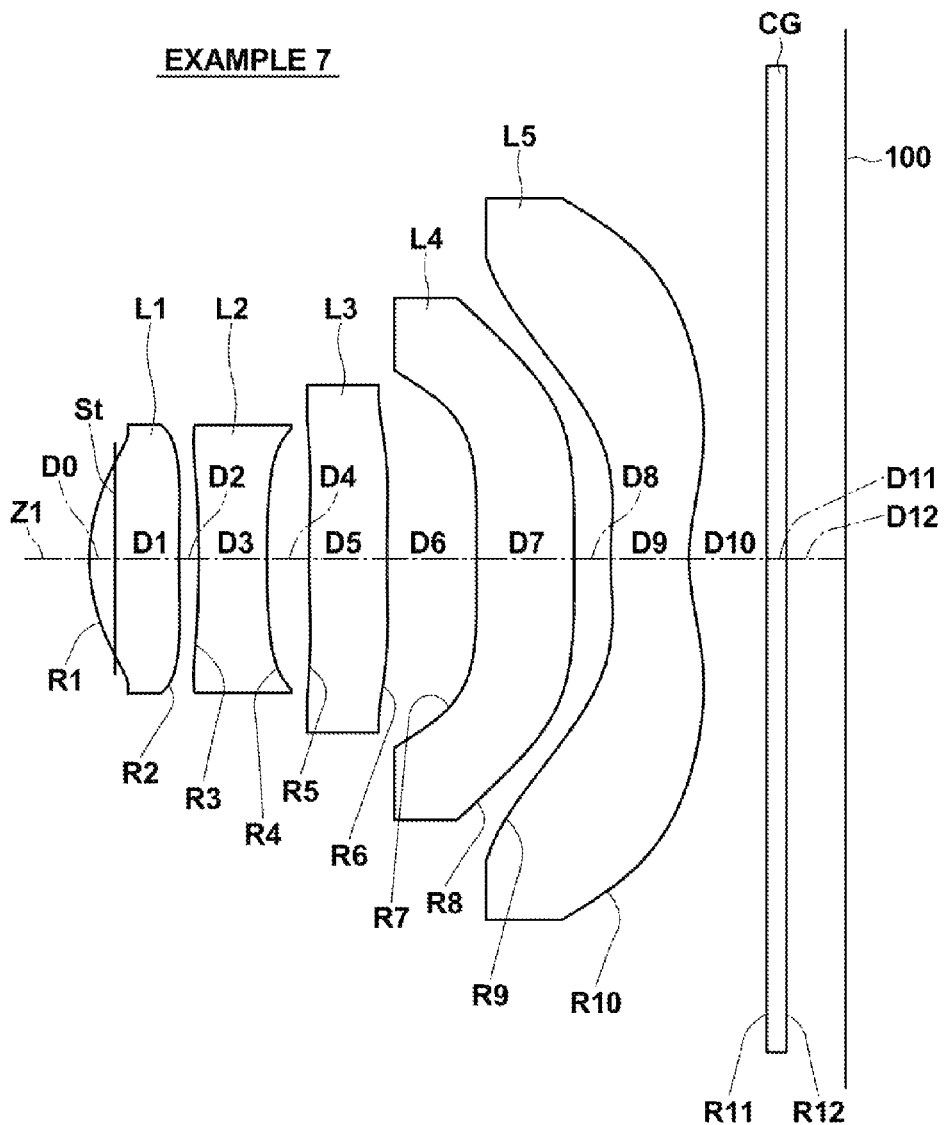
FIG. 7 illustrates a seventh configuration example of the image capturing lens according to an embodiment of the present invention, which is a cross-sectional view of a lens corresponding to Example 7.
Figure 8:
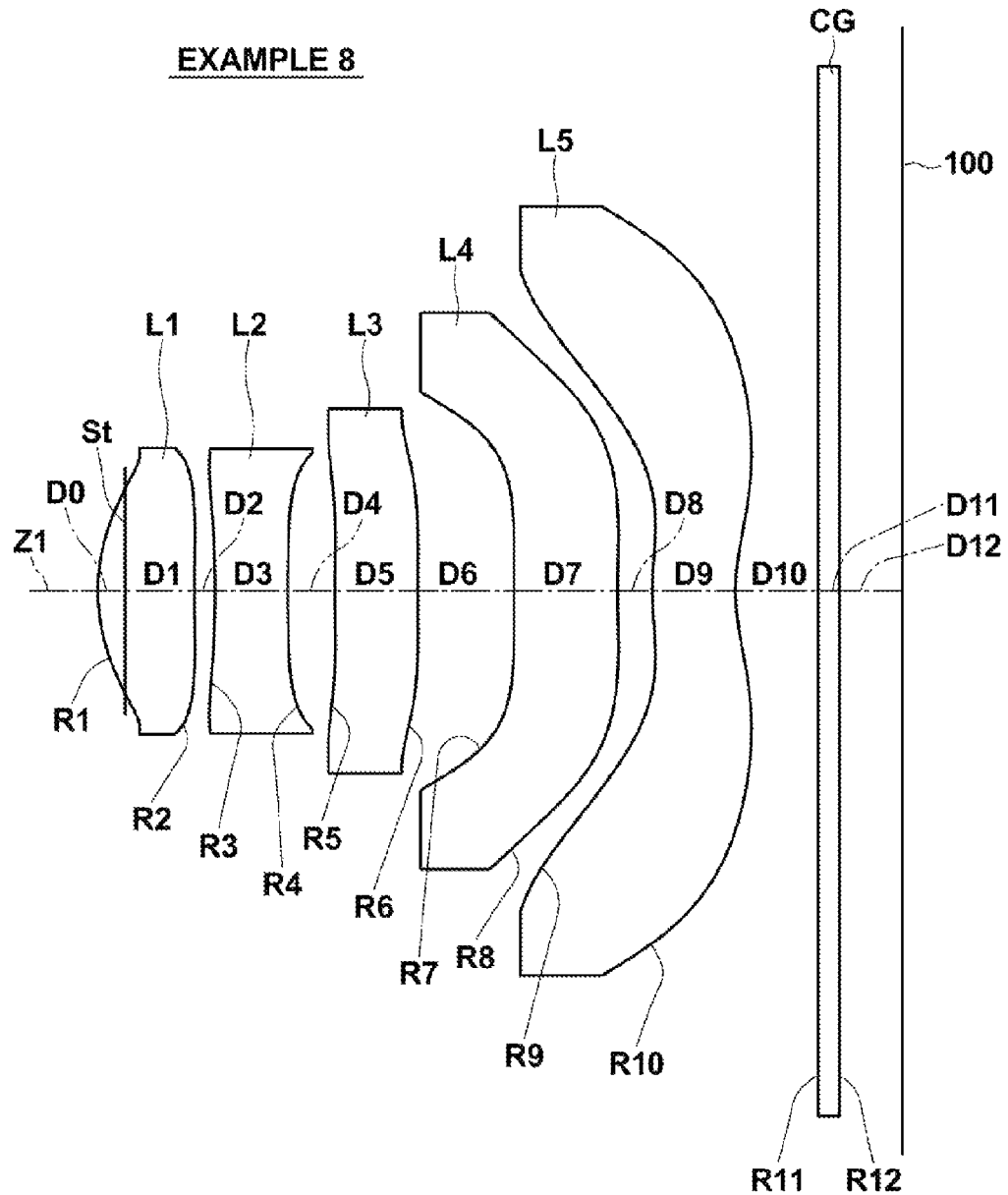
FIG. 8 illustrates an eighth configuration example of the image capturing lens according to an embodiment of the present invention, which is a cross-sectional view of a lens corresponding to Example 8.
Figure 9:
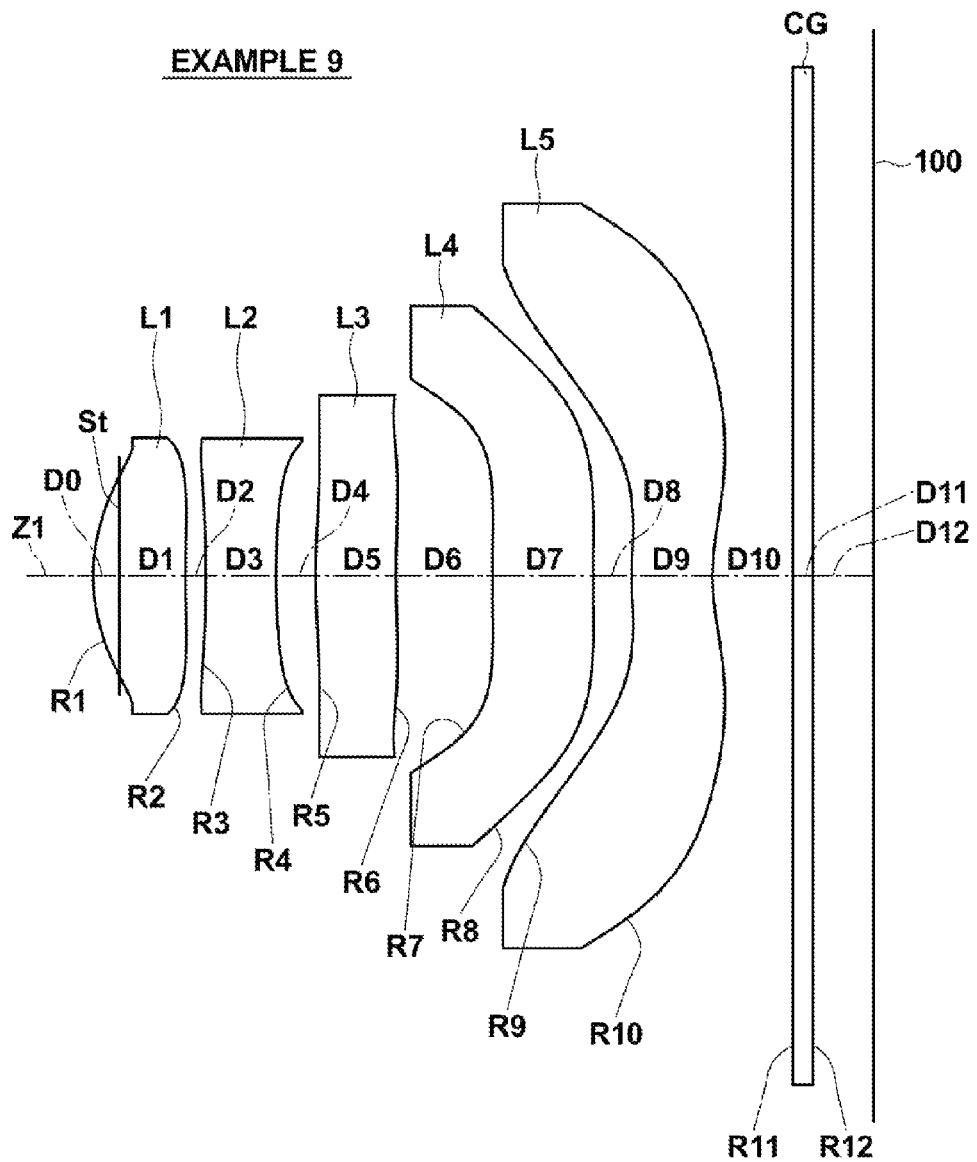
FIG. 9 illustrates a ninth configuration example of the image capturing lens according to an embodiment of the present invention, which is a cross-sectional view of a lens corresponding to Example 9.
Figure 10:
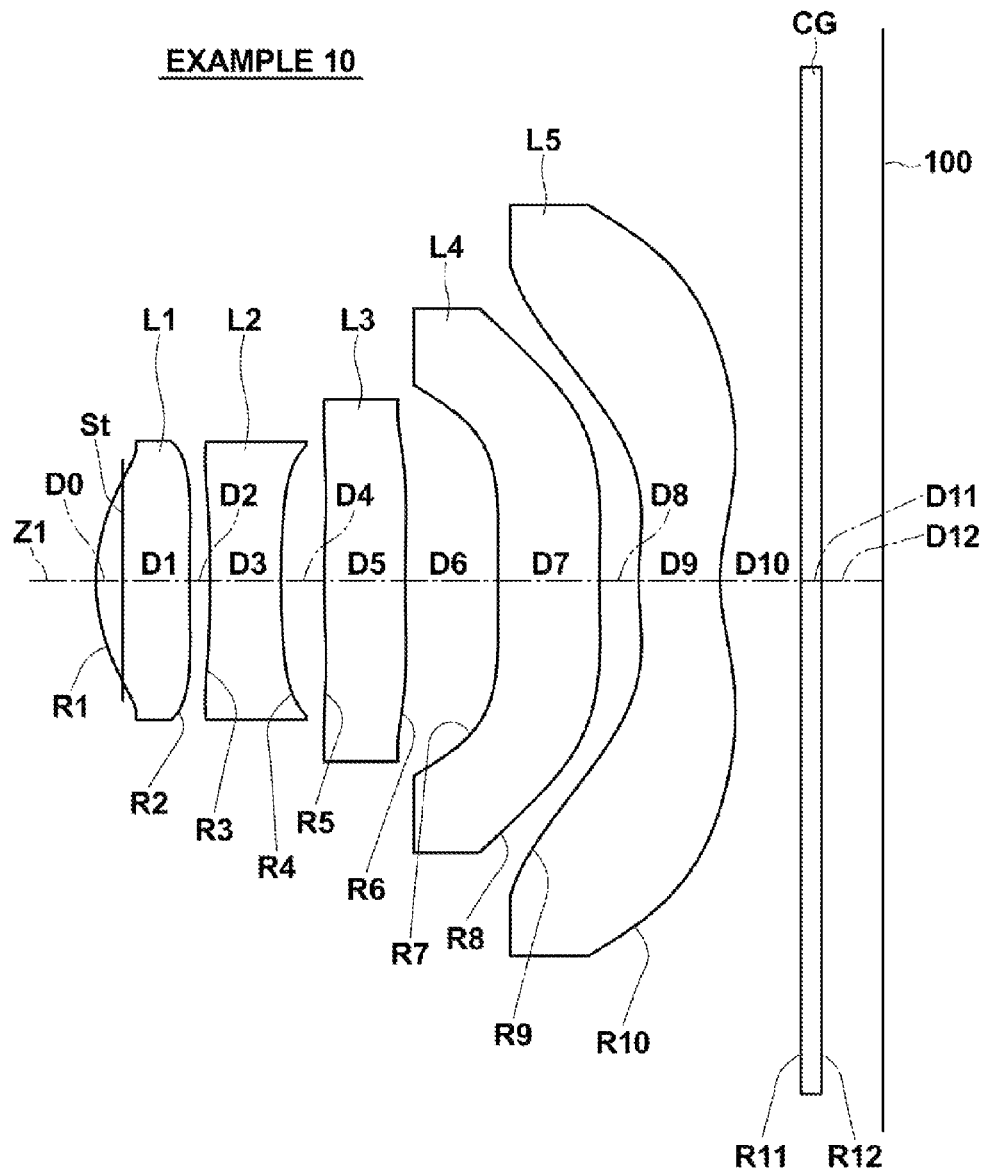
FIG. 10 illustrates a tenth configuration example of the image capturing lens according to an embodiment of the present invention, which is a cross-sectional view of a lens corresponding to Example 10.
Figure 11:
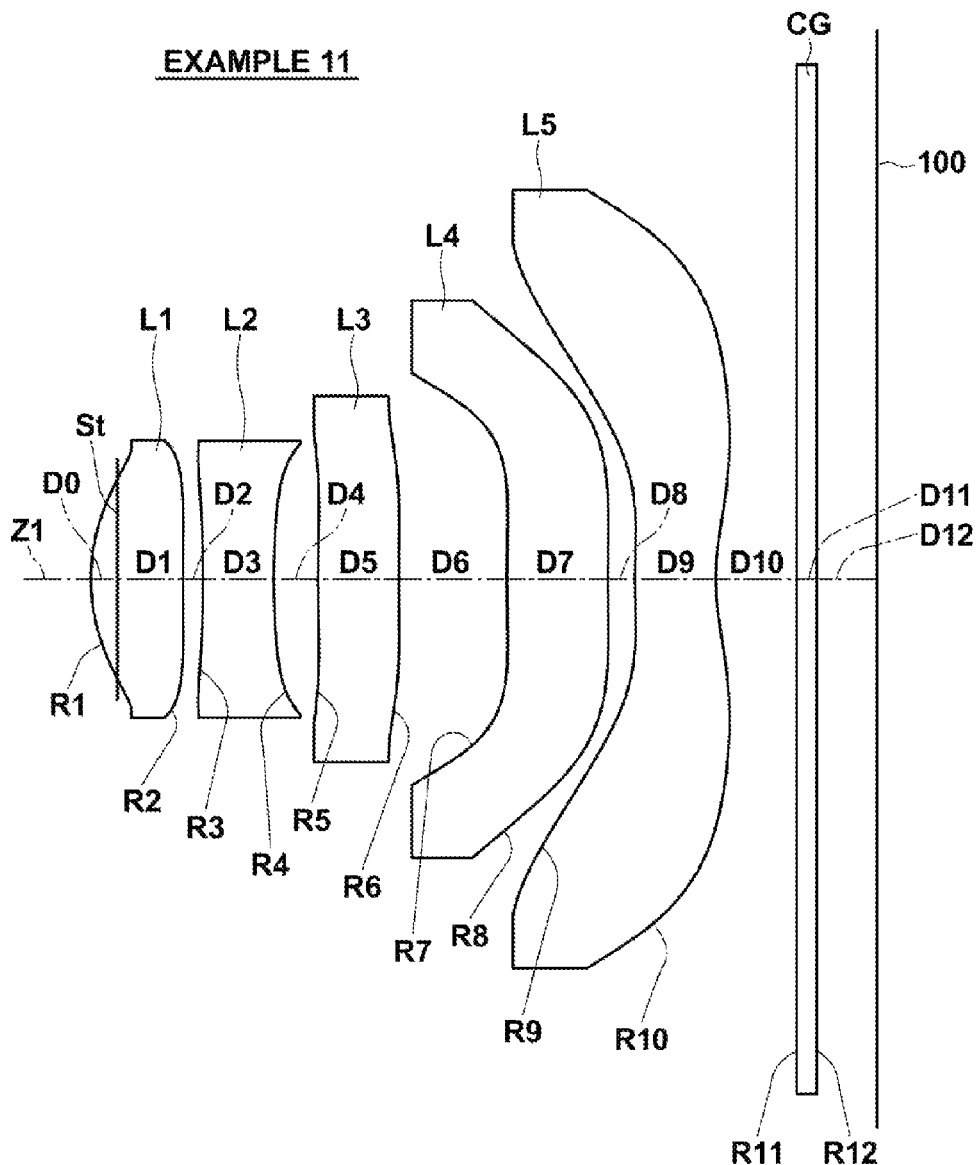
FIG. 11 illustrates an eleventh configuration example of the image capturing lens according to an embodiment of the present invention, which is a cross-sectional view of a lens corresponding to Example 11.
Figure 12:
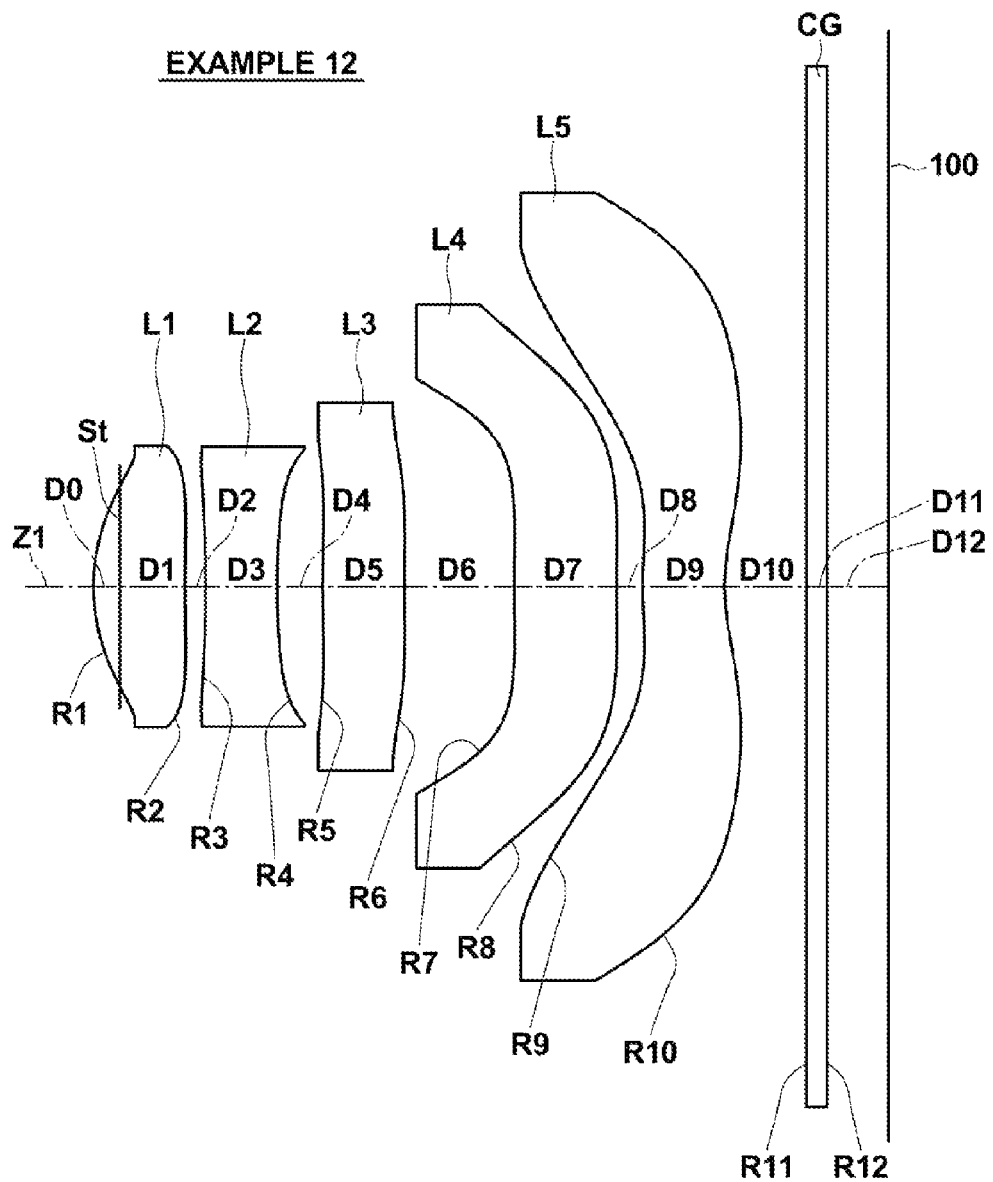
FIG. 12 illustrates a twelfth configuration example of the image capturing lens according to an embodiment of the present invention, which is a cross-sectional view of a lens corresponding to Example 12.
Figure 13:
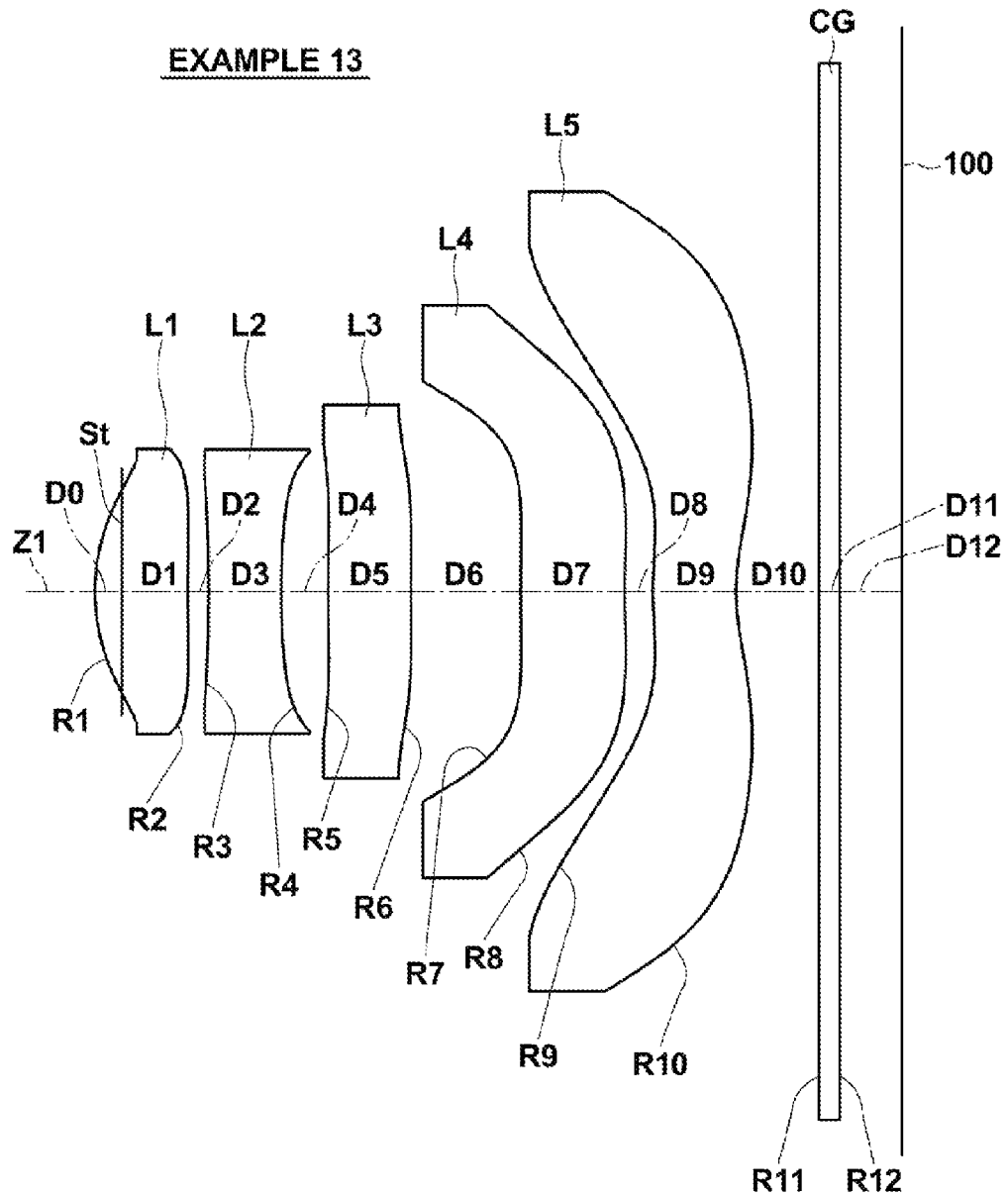
FIG. 13 illustrates a thirteenth configuration example of the image capturing lens according to an embodiment of the present invention, which is a cross-sectional view of a lens corresponding to Example 13.

As in the image capturing lens of Example 1 described above, specific lens data corresponding to the configuration of image capturing lens shown in FIG. 2 are taken as Example 2 and shown in Tables 2 and 15, and specific lens data corresponding to the configuration of image capturing lens shown in FIG. 3 are taken as Example 3 and shown in Tables 3 and 16. Likewise, specific lens data corresponding to the configurations of image capturing lenses shown in FIGS. 6 to 13 are taken as Examples 6 to 13 and shown in Tables 6 to 13 and tables 19 to 26. Note that the lens data of reference examples shown in FIGS. 4 and 5 are also shown in Tables 4, 5 and Tables 17, 18. In the image capturing lens according to Examples 2, 3 and Examples 6 to 13, each of all the first lens L1 to fifth lens L5 have an aspherical shape on both sides.

Further, Table 27 summarizes values of each of conditional expressions described above for each example and reference example. The Table 27 further includes F-numbers Fno and focal lengths of overall systems as additional data. In the lens data of each example and reference example described in Tables 1 to 13 below, "mm" is used as the unit of length, but any other appropriate unit may also be used since an optical system may be used by proportionally expanded or reduced.

A to C of FIG. 14 show spherical aberration, astigmatism (field curvature), and distortion (distortion aberration) of the image capturing lens of Example 1 respectively. Each aberration diagram indicates aberration with respect to the d-line (wavelength 587.56 nm). The diagrams of spherical aberration and astigmatism also indicate aberrations with respect to g-line (wavelength 435.83 nm) and C-line (wavelength 656.27 nm). In the diagram of astigmatism, the solid line indicates aberration in the sagittal direction (S) and the broken line indicates aberration in the tangential direction (T). The Fno represents an F-number and Y represents an image height (Y).

Figure 18:
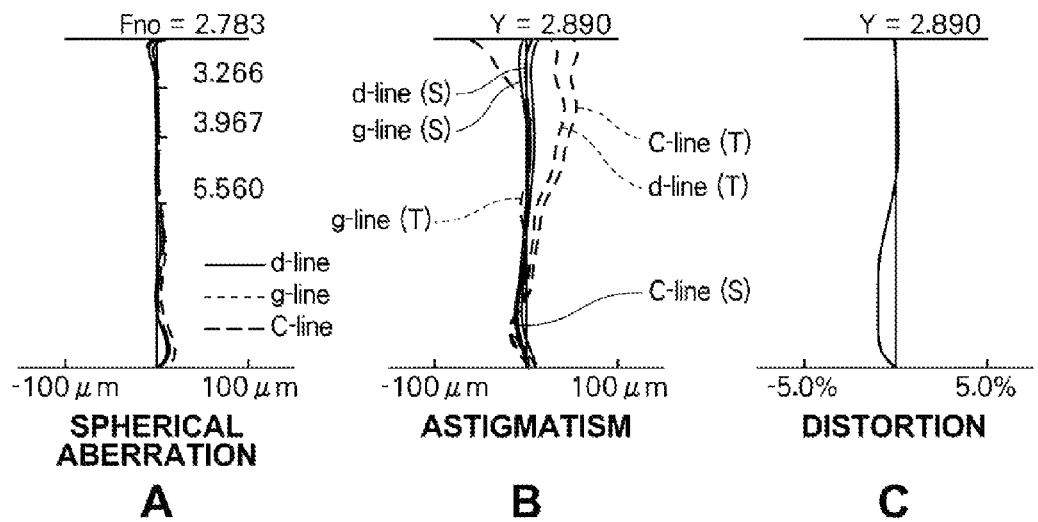
FIG. 18 shows aberration diagrams illustrating various types of aberrations of an image capturing lens according to Reference Example 5 of the present invention, in which A illustrates spherical aberration, B illustrates astigmatism (field curvature), and C illustrates distortion.
Figure 19:
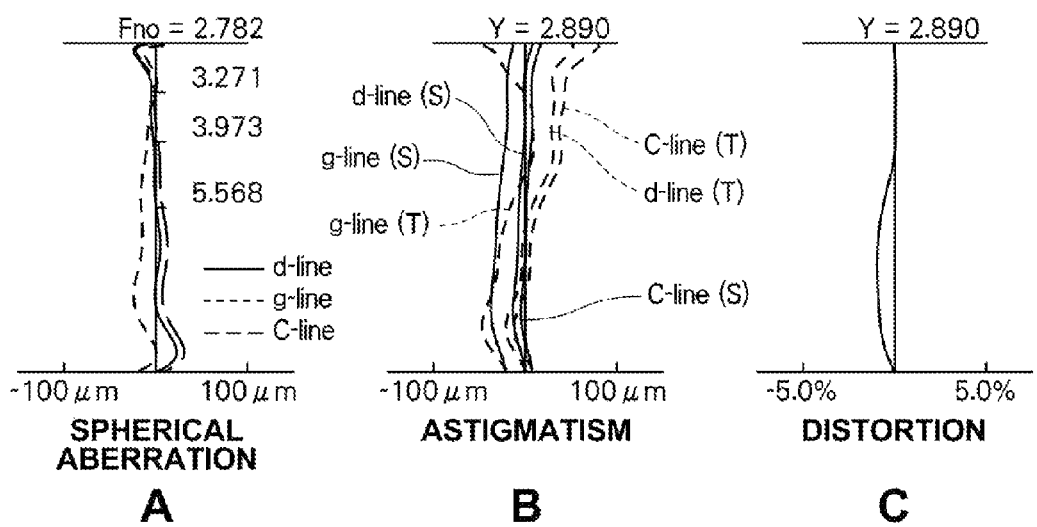
FIG. 19 shows aberration diagrams illustrating various types of aberrations of an image capturing lens according to Example 6 of the present invention, in which A illustrates spherical aberration, B illustrates astigmatism (field curvature), and C illustrates distortion.
Figure 26:
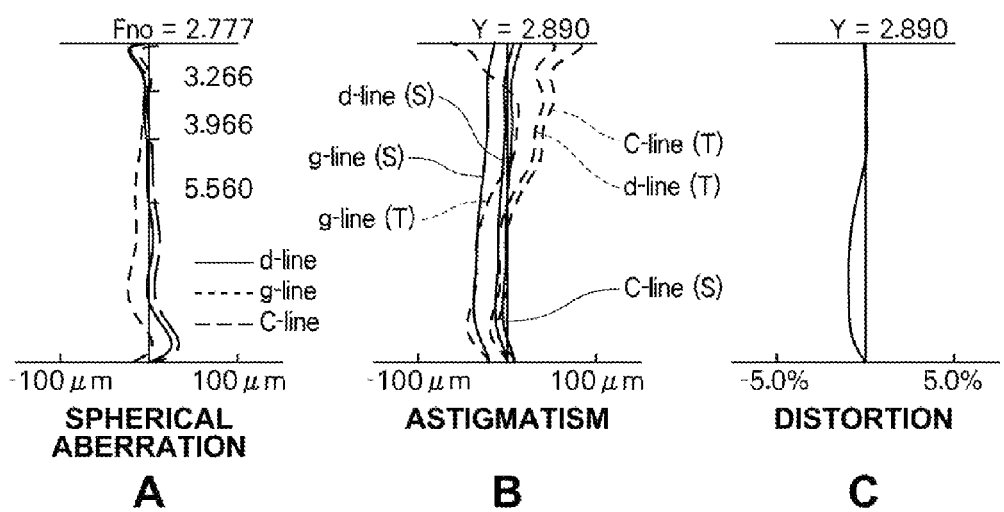
FIG. 26 shows aberration diagrams illustrating various types of aberrations of an image capturing lens according to Example 13 of the present invention, in which A illustrates spherical aberration, B illustrates astigmatism (field curvature), and C illustrates distortion.

Likewise, various aberrations of the image capturing lens of Example 2 are shown in A to C of FIG. 15. Similarly, various aberrations of image capturing lenses of Example 3 and Examples 6 to 13 are shown in A to C of FIG. 16 and A to C of FIG. 19 to A to C of FIG. 26. A to C of FIG. 17 and A to C of FIG. 18 show various types of aberrations of Reference Examples 4 and 5 respectively.

As is known from each numerical data and aberration diagram, high image forming performance is realized in each example along with the reduction in overall length.

It should be appreciated that the present invention is not limited to the aforementioned embodiment and each example and various modifications may be made. For example, values of the radius of curvature of each lens component, surface distance, refractive index, Abbe number, aspherical surface coefficient and the like are not limited to those shown in each numerical example and other values may also be possible.

Further, in each example, the description has been made on the assumption that the image capturing lens is used as a fixed focal length lens. But it is possible to employ a configuration that allows focus adjustment. For example, it is also possible to employ a configuration that allows auto focusing by paying out the entire lens system or moving some of the lenses on the optical axis.

TABLE 1

EXAMPLE 1 • BASIC LENS DATA

| Si | Ri | Di | Ndj | vdj |
|---|---|---|---|---|
| 0 | ∞ | −0.2200 | | |
| 1* | 1.3359 | 0.5115 | 1.533914 | 55.89 |
| 2* | 6.6903 | 0.1124 | | |
| 3* | −245.9763 | 0.3933 | 1.633506 | 23.63 |
| 4* | 6.3016 | 0.2902 | | |
| 5* | 50.3438 | 0.4493 | 1.533914 | 55.89 |
| 6* | −45.5346 | 0.5174 | | |
| 7* | 21.7646 | 0.5618 | 1.633506 | 23.63 |
| 8* | 7.0187 | 0.2000 | | |
| 9* | 1.6981 | 0.4494 | 1.533914 | 55.89 |
| 10* | 1.0665 | 0.5057 | | |
| 11 | ∞ | 0.1000 | 1.516330 | 64.14 |
| 12 | ∞ | 0.8028 | | |

*ASPHERICAL SURFACE

TABLE 2

EXAMPLE 2 • BASIC LENS DATA

| Si | Ri | Di | Ndj | vdj |
|---|---|---|---|---|
| 0 | ∞ | −0.2200 | | |
| 1* | 1.3472 | 0.4935 | 1.533914 | 55.89 |
| 2* | 5.2941 | 0.1124 | | |
| 3* | 231.8734 | 0.3933 | 1.633506 | 23.63 |
| 4* | 8.7537 | 0.3789 | | |
| 5* | 42.2345 | 0.4493 | 1.533914 | 55.89 |
| 6* | −122.7754 | 0.5187 | | |
| 7* | 8.2287 | 0.5618 | 1.633506 | 23.63 |
| 8* | 3.6423 | 0.1378 | | |
| 9* | 1.6578 | 0.4494 | 1.533914 | 55.89 |
| 10* | 1.1259 | 0.5057 | | |
| 11 | ∞ | 0.1000 | 1.516330 | 64.14 |
| 12 | ∞ | 0.8028 | | |

*ASPHERICAL SURFACE

TABLE 3

EXAMPLE 3 • BASIC LENS DATA

| Si | Ri | Di | Ndj | vdj |
|---|---|---|---|---|
| 0 | ∞ | −0.2000 | | |
| 1* | 1.4080 | 0.5084 | 1.533914 | 55.89 |
| 2* | 7.9161 | 0.1124 | | |
| 3* | 198.9232 | 0.3933 | 1.633506 | 23.63 |
| 4* | 5.4076 | 0.2736 | | |
| 5* | 10.0731 | 0.4493 | 1.533914 | 55.89 |
| 6* | 32.3304 | 0.5073 | | |
| 7* | 23.8703 | 0.5618 | 1.633506 | 23.63 |
| 8* | 13.4109 | 0.2844 | | |
| 9* | 1.7162 | 0.4494 | 1.533914 | 55.89 |
| 10* | 0.9942 | 0.5057 | | |
| 11 | ∞ | 0.1000 | 1.516330 | 64.14 |
| 12 | ∞ | 0.8028 | | |

*ASPHERICAL SURFACE

TABLE 4

REFERENCE EXAMPLE 4 • BASIC LENS DATA

| Si | Ri | Di | Ndj | vdj |
|---|---|---|---|---|
| 0 | ∞ | −0.1300 | | |
| 1* | 1.1636 | 0.4480 | 1.533914 | 55.89 |
| 2* | 21.8004 | 0.1000 | | |
| 3* | −2.6941 | 0.3500 | 1.633506 | 23.63 |
| 4* | 108.8471 | 0.1492 | | |
| 5* | 2.8944 | 0.3998 | 1.533914 | 55.89 |
| 6* | 7.1726 | 0.6413 | | |
| 7* | −12.8166 | 0.4999 | 1.533914 | 55.89 |
| 8* | 30.2424 | 0.1000 | | |
| 9* | 3.5085 | 0.3998 | 1.533914 | 55.89 |
| 10* | 1.3526 | 0.4000 | | |
| 11 | ∞ | 0.1000 | 1.516330 | 64.14 |
| 12 | ∞ | 0.7144 | | |

*ASPHERICAL SURFACE

TABLE 5

REFERENCE EXAMPLE 5 • BASIC LENS DATA

| Si | Ri | Di | Ndj | vdj |
|---|---|---|---|---|
| 0 | ∞ | −0.1300 | | |
| 1* | 1.2941 | 0.4594 | 1.533914 | 55.89 |
| 2* | −17.4054 | 0.1000 | | |
| 3* | −2.8976 | 0.3500 | 1.633506 | 23.63 |
| 4* | 9.1506 | 0.1456 | | |
| 5* | 2.4277 | 0.3998 | 1.533914 | 55.89 |
| 6* | 6.9579 | 0.6923 | | |
| 7* | −41.8182 | 0.4999 | 1.533914 | 55.89 |
| 8* | 12.1255 | 0.1000 | | |
| 9* | 2.3504 | 0.3998 | 1.533914 | 55.89 |
| 10* | 1.1070 | 0.4000 | | |
| 11 | ∞ | 0.1000 | 1.516330 | 64.14 |
| 12 | ∞ | 0.7144 | | |

*ASPHERICAL SURFACE

TABLE 6

EXAMPLE 6 • BASIC LENS DATA

| Si | Ri | Di | Ndj | vdj |
|---|---|---|---|---|
| 0 | ∞ | −0.1300 | | |
| 1* | 1.1676 | 0.4620 | 1.533914 | 55.89 |
| 2* | 10.0593 | 0.1000 | | |
| 3* | −8.4456 | 0.3500 | 1.633506 | 23.63 |
| 4* | 6.0894 | 0.2094 | | |
| 5* | 4.9793 | 0.3998 | 1.533914 | 55.89 |
| 6* | 8.5209 | 0.4701 | | |
| 7* | 22.9906 | 0.4999 | 1.633506 | 23.63 |
| 8* | 9.1343 | 0.1827 | | |
| 9* | 2.4078 | 0.3998 | 1.533914 | 55.89 |
| 10* | 1.1637 | 0.4000 | | |
| 11 | ∞ | 0.1000 | 1.516330 | 64.14 |
| 12 | ∞ | 0.7144 | | |

*ASPHERICAL SURFACE

TABLE 7

EXAMPLE 7 • BASIC LENS DATA

| Si | Ri | Di | Ndj | vdj |
|---|---|---|---|---|
| 0 | ∞ | −0.1300 | | |
| 1* | 1.1627 | 0.4607 | 1.533914 | 55.89 |
| 2* | 9.3377 | 0.1000 | | |
| 3* | −8.6102 | 0.3500 | 1.633506 | 23.63 |
| 4* | 6.4229 | 0.2146 | | |
| 5* | 5.1957 | 0.3998 | 1.533914 | 55.89 |

TABLE 7-continued

EXAMPLE 7 • BASIC LENS DATA

| Si | Ri | Di | Ndj | vdj |
|---|---|---|---|---|
| 6* | 8.1209 | 0.4595 | | |
| 7* | 29.6668 | 0.4999 | 1.633506 | 23.63 |
| 8* | 16.0401 | 0.1892 | | |
| 9* | 2.6962 | 0.3998 | 1.533914 | 55.89 |
| 10* | 1.1734 | 0.4000 | | |
| 11 | ∞ | 0.1000 | 1.516330 | 64.14 |
| 12 | ∞ | 0.7144 | | |

*ASPHERICAL SURFACE

TABLE 8

EXAMPLE 8 • BASIC LENS DATA

| Si | Ri | Di | Ndj | vdj |
|---|---|---|---|---|
| 0 | ∞ | −0.1300 | | |
| 1* | 1.1594 | 0.4644 | 1.533914 | 55.89 |
| 2* | 11.3986 | 0.1000 | | |
| 3* | −6.3129 | 0.3500 | 1.633506 | 23.63 |
| 4* | 10.7458 | 0.2269 | | |
| 5* | 10.1906 | 0.3998 | 1.533914 | 55.89 |
| 6* | 19.0894 | 0.4638 | | |
| 7* | 25.3474 | 0.4999 | 1.633506 | 23.63 |
| 8* | 4.8367 | 0.1666 | | |
| 9* | 1.8361 | 0.3998 | 1.533914 | 55.89 |
| 10* | 1.1281 | 0.4000 | | |
| 11 | ∞ | 0.1000 | 1.516330 | 64.14 |
| 12 | ∞ | 0.7144 | | |

*ASPHERICAL SURFACE

TABLE 9

EXAMPLE 9 • BASIC LENS DATA

| Si | Ri | Di | Ndj | vdj |
|---|---|---|---|---|
| 0 | ∞ | −0.1300 | | |
| 1* | 1.1722 | 0.4587 | 1.533914 | 55.89 |
| 2* | 8.0853 | 0.1000 | | |
| 3* | −13.3183 | 0.3500 | 1.633506 | 23.63 |
| 4* | 4.4695 | 0.1963 | | |
| 5* | 3.5285 | 0.3998 | 1.533914 | 55.89 |
| 6* | 5.8132 | 0.4796 | | |
| 7* | 10.0919 | 0.4999 | 1.633506 | 23.63 |
| 8* | 7.7021 | 0.1922 | | |
| 9* | 3.1609 | 0.3998 | 1.533914 | 55.89 |
| 10* | 1.3006 | 0.4000 | | |
| 11 | ∞ | 0.1000 | 1.516330 | 64.14 |
| 12 | ∞ | 0.7144 | | |

*ASPHERICAL SURFACE

TABLE 10

EXAMPLE 10 • BASIC LENS DATA

| Si | Ri | Di | Ndj | vdj |
|---|---|---|---|---|
| 0 | ∞ | −0.1300 | | |
| 1* | 1.1697 | 0.4620 | 1.533914 | 55.89 |
| 2* | 9.4680 | 0.1000 | | |
| 3* | −9.4415 | 0.3500 | 1.633506 | 23.63 |
| 4* | 5.9086 | 0.2123 | | |
| 5* | 4.8979 | 0.3998 | 1.533914 | 55.89 |
| 6* | 7.5445 | 0.4556 | | |
| 7* | 11.7308 | 0.4999 | 1.633506 | 23.63 |
| 8* | 4.4699 | 0.1941 | | |

TABLE 10-continued

EXAMPLE 10 • BASIC LENS DATA

| Si | Ri | Di | Ndj | vdj |
|---|---|---|---|---|
| 9* | 1.7967 | 0.3998 | 1.533914 | 55.89 |
| 10* | 1.0934 | 0.4000 | | |
| 11 | ∞ | 0.1000 | 1.516330 | 64.14 |
| 12 | ∞ | 0.7144 | | |

*ASPHERICAL SURFACE

TABLE 11

EXAMPLE 11 • BASIC LENS DATA

| Si | Ri | Di | Ndj | vdj |
|---|---|---|---|---|
| 0 | ∞ | −0.1300 | | |
| 1* | 1.1671 | 0.4543 | 1.533914 | 55.89 |
| 2* | 12.2300 | 0.1000 | | |
| 3* | −9.1978 | 0.3500 | 1.633506 | 23.63 |
| 4* | 4.9919 | 0.2177 | | |
| 5* | 5.8944 | 0.3998 | 1.533914 | 55.89 |
| 6* | 11.0868 | 0.5337 | | |
| 7* | 8.7943 | 0.4999 | 1.633506 | 23.63 |
| 8* | 7.9571 | 0.1323 | | |
| 9* | 3.7337 | 0.3998 | 1.533914 | 55.89 |
| 10* | 1.3680 | 0.4000 | | |
| 11 | ∞ | 0.1000 | 1.516330 | 64.14 |
| 12 | ∞ | 0.7144 | | |

TABLE 12

EXAMPLE 12 • BASIC LENS DATA

| Si | Ri | Di | Ndj | vdj |
|---|---|---|---|---|
| 0 | ∞ | −0.1300 | | |
| 1* | 1.1637 | 0.4476 | 1.533914 | 55.89 |
| 2* | 9.2074 | 0.1000 | | |
| 3* | −14.6861 | 0.3500 | 1.633506 | 23.63 |
| 4* | 4.5557 | 0.2225 | | |
| 5* | 6.4937 | 0.3998 | 1.533914 | 55.89 |
| 6* | 15.9278 | 0.5349 | | |
| 7* | 14.7901 | 0.4999 | 1.633506 | 23.63 |
| 8* | 8.3920 | 0.1288 | | |
| 9* | 2.6989 | 0.3998 | 1.533914 | 55.89 |
| 10* | 1.2320 | 0.4000 | | |
| 11 | ∞ | 0.1000 | 1.516330 | 64.14 |
| 12 | ∞ | 0.7144 | | |

*ASPHERICAL SURFACE

TABLE 13

EXAMPLE 13 • BASIC LENS DATA

| Si | Ri | Di | Ndj | vdj |
|---|---|---|---|---|
| 0 | ∞ | −0.1300 | | |
| 1* | 1.1643 | 0.4468 | 1.533914 | 55.89 |
| 2* | 9.3217 | 0.1000 | | |
| 3* | −14.3186 | 0.3500 | 1.633506 | 23.63 |
| 4* | 4.6681 | 0.2252 | | |
| 5* | 6.9755 | 0.3998 | 1.533914 | 55.89 |
| 6* | 16.2964 | 0.5283 | | |
| 7* | 10.1168 | 0.4999 | 1.633506 | 23.63 |
| 8* | 4.5950 | 0.1349 | | |
| 9* | 2.1307 | 0.3998 | 1.533914 | 55.89 |
| 10* | 1.2059 | 0.4000 | | |
| 11 | ∞ | 0.1000 | 1.516330 | 64.14 |
| 12 | ∞ | 0.7144 | | |

*ASPHERICAL SURFACE

TABLE 14

EXAMPLE 1 • ASPHERICAL SURFACE DATA

| SURF. No. | K | A3 | A4 | A5 | A6 |
|---|---|---|---|---|---|
| 1 | −1.454934E+01 | −1.111267E−01 | 1.429124E+00 | −1.580364E+00 | −9.562729E−01 |
| 2 | −4.256952E+01 | −4.394179E−02 | 1.507574E−01 | −4.444023E−01 | −9.762619E−01 |
| 3 | 1.000000E+02 | 1.039459E−01 | −8.299394E−01 | 2.482708E+00 | −4.319225E+00 |
| 4 | 1.500818E+00 | 2.728358E−02 | −2.295967E−01 | 7.798384E−01 | −1.500331E+00 |
| 5 | −9.523480E+01 | −6.387755E−02 | 8.220414E−02 | 1.874429E+00 | −2.341737E+01 |
| 6 | 9.919054E+01 | 1.885916E−03 | −6.342686E−02 | −9.574731E−01 | 4.336511E+00 |
| 7 | −2.644016E+01 | −4.582691E−02 | 9.913886E−02 | −1.906860E−01 | −8.844103E−01 |
| 8 | −2.438698E+01 | −1.134174E−01 | −8.182119E−02 | −5.874849E−01 | 3.150750E+00 |
| 9 | −1.000000E+02 | 4.307237E−01 | −1.134604E+00 | 1.900692E−01 | 1.790057E−01 |
| 10 | −3.801121E+00 | −9.357387E−02 | −2.975363E−01 | 2.714803E−01 | 4.595275E−03 |

| | A7 | A8 | A9 | A10 | A11 |
|---|---|---|---|---|---|
| 1 | −9.580317E+00 | 7.309452E+01 | −1.793834E+02 | 2.036939E+02 | −8.337386E+01 |
| 2 | 5.863327E+00 | −8.745163E+00 | 3.815866E+00 | −6.234165E+00 | 1.890461E+01 |
| 3 | 5.398842E+00 | −9.685721E+00 | 1.804694E+01 | −1.024746E+01 | −1.845105E+01 |
| 4 | 2.857889E+00 | −6.992226E+00 | 1.452838E+01 | −1.119855E+01 | −9.252294E+00 |
| 5 | 1.043854E+02 | −2.422241E+02 | 2.892904E+02 | −1.191843E+02 | −2.321430E+00 |
| 6 | −1.106664E+01 | 1.847172E+01 | −2.260815E+01 | 2.103681E+01 | −1.086773E+01 |
| 7 | 2.600842E+00 | −2.267086E+00 | −8.780359E−01 | 2.265257E+00 | −6.783223E−01 |
| 8 | −7.186193E+00 | 9.988929E+00 | −8.960517E+00 | 4.838565E+00 | −1.137540E+00 |
| 9 | 1.380999E+00 | −1.970144E+00 | 7.301552E−01 | 1.411684E−01 | −7.449587E−02 |
| 10 | −7.112280E−02 | 9.123161E−03 | 1.154795E−02 | −4.143885E−03 | 5.896408E−04 |

| | A12 | A13 | A14 | A15 | A16 |
|---|---|---|---|---|---|
| 1 | −3.103899E+01 | 4.611238E+01 | −5.464681E+01 | 6.210936E+01 | −2.574644E+01 |
| 2 | −3.062138E+00 | −3.236077E+01 | 2.622516E+01 | 2.704198E+00 | −5.992546E+00 |
| 3 | 1.874501E+01 | 3.079313E+01 | −6.534288E+01 | 4.428478E+01 | −1.095243E+01 |

TABLE 14-continued

EXAMPLE 1 • ASPHERICAL SURFACE DATA

| | | | | | |
|---|---|---|---|---|---|
| 4 | 1.588880E+01 | 6.966667E+00 | −2.230135E+01 | 1.304232E+01 | −2.423774E+00 |
| 5 | −2.964010E+02 | 7.356801E+02 | −7.258352E+02 | 3.428726E+02 | −6.481061E+01 |
| 6 | −2.408684E+00 | 5.397751E+00 | 4.686056E−01 | −2.739436E+00 | 9.059573E−01 |
| 7 | 3.195106E−01 | −1.709026E+00 | 1.907131E+00 | −8.561318E−01 | 1.444129E−01 |
| 8 | −2.448102E−01 | 2.293413E−01 | −4.601920E−02 | −1.792495E−03 | 1.223672E−03 |
| 9 | −5.707189E−02 | 2.339313E−02 | 5.828893E−03 | −3.900221E−03 | 4.977764E−04 |
| 10 | −2.438347E−04 | −1.311847E−05 | 7.275490E−05 | −2.154746E−05 | 1.749801E−06 |

TABLE 15

EXAMPLE 2 • ASPHERICAL SURFACE DATA

| SURF. No. | K | A3 | A4 | A5 | A6 |
|---|---|---|---|---|---|
| 1 | −1.455142E+01 | −1.142541E−01 | 1.365005E+00 | −7.351565E−01 | −7.330350E+00 |
| 2 | −4.203413E+01 | −4.381826E−02 | 1.719685E−01 | −6.395361E−01 | 3.901158E−01 |
| 3 | −1.000000E+02 | 1.198936E−01 | −9.325998E−01 | 2.471072E+00 | −2.182061E+00 |
| 4 | −5.450136E−01 | 2.676195E−02 | −2.227495E−01 | 5.770954E−01 | 7.440757E−01 |
| 5 | −9.403252E+01 | −1.155921E−01 | 8.075937E−01 | −4.022161E+00 | 8.836886E+00 |
| 6 | −1.000000E+02 | 3.966438E−03 | −1.183216E−01 | −3.057917E−01 | 4.416090E−01 |
| 7 | −2.642344E+01 | −4.169962E−02 | 1.766639E−01 | −5.146532E−01 | −2.029113E−02 |
| 8 | −2.372378E+01 | −1.075712E−01 | −1.942598E−01 | 4.513879E−01 | −5.386540E−01 |
| 9 | −1.000000E+02 | 4.402655E−01 | −1.021531E+00 | −5.159440E−01 | 1.844065E+00 |
| 10 | −3.883550E+00 | −8.796406E−02 | −3.558116E−01 | 4.941327E−01 | −6.124750E−01 |

| | A7 | A8 | A9 | A10 | A11 |
|---|---|---|---|---|---|
| 1 | 1.987111E+01 | −1.337449E+01 | −1.751313E+01 | 2.016933E+01 | 1.815550E+01 |
| 2 | −1.942498E−01 | 8.082565E+00 | −2.706288E+01 | 2.860454E+01 | 3.869857E+00 |
| 3 | −4.727357E+00 | 1.136481E+01 | −3.501222E−01 | −1.472198E+01 | −1.124092E+00 |
| 4 | −8.348717E+00 | 2.426537E+01 | −3.988610E+01 | 4.996191E+01 | −5.388295E+01 |
| 5 | −9.179721E+00 | 2.439182E+00 | 7.059075E+00 | 3.945663E+00 | −1.350060E+01 |
| 6 | 1.226292E+00 | −4.607991E+00 | 4.196086E+00 | 2.423768E+00 | −5.241498E+00 |
| 7 | 9.692252E−01 | −1.006180E+00 | 6.601896E−01 | −2.616770E+00 | 4.597139E+00 |
| 8 | 4.366114E−01 | −3.979948E−01 | 3.738779E−01 | −3.344652E−01 | 2.525460E−01 |
| 9 | −1.002264E+00 | 3.062171E−01 | −6.454106E−01 | 5.283756E−01 | 3.897036E−02 |
| 10 | 8.608566E−01 | −7.511912E−01 | 3.550432E−01 | −9.634943E−02 | 3.567678E−02 |

| | A12 | A13 | A14 | A15 | A16 |
|---|---|---|---|---|---|
| 1 | −2.331267E+01 | 1.483749E+01 | −6.454555E+01 | 8.727528E+01 | −3.474869E+01 |
| 2 | −2.120611E+01 | 2.854317E+00 | −4.947323E−01 | 1.351898E+01 | −8.059879E+00 |
| 3 | 3.015126E+01 | −2.625783E+01 | 1.698204E+00 | 7.076858E+00 | −2.574124E+00 |
| 4 | 4.225998E+01 | −1.994134E+01 | 9.235185E+00 | −7.372948E+00 | 2.753667E+00 |
| 5 | −6.126546E+00 | −3.594204E−01 | 1.109946E+01 | −8.645806E+00 | 1.891309E+00 |
| 6 | 9.506468E−02 | 2.014562E+00 | 1.443100E+00 | −2.391513E+00 | 7.130098E−01 |
| 7 | −2.516426E+00 | −1.044190E+00 | 1.881249E+00 | −8.357300E−01 | 1.306242E−01 |
| 8 | −1.164959E−01 | 1.868955E−02 | 7.401367E−03 | −4.070105E−03 | 5.907801E−04 |
| 9 | −2.275206E−01 | 1.085334E−01 | −1.847904E−02 | 5.186374E−05 | 2.125049E−04 |
| 10 | −3.035403E−02 | 1.813931E−02 | −6.104122E−03 | 1.098352E−03 | −8.296285E−05 |

TABLE 16

EXAMPLE 3 • ASPHERICAL SURFACE DATA

| SURF. No. | K | A3 | A4 | A5 | A6 |
|---|---|---|---|---|---|
| 1 | −1.454933E+01 | −9.709651E−02 | 1.254214E+00 | −9.989284E−01 | −5.214535E+00 |
| 2 | −4.351415E+01 | −2.635031E−01 | 5.779937E+00 | −5.691074E+01 | 3.011085E+02 |
| 3 | −1.000000E+02 | 9.307483E−02 | −7.645634E−01 | 2.073983E+00 | −3.040919E+00 |
| 4 | 1.243487E+00 | 2.306770E−02 | −2.582779E−01 | 1.048535E+00 | −4.396230E+00 |
| 5 | −8.754990E+01 | −7.926790E−02 | 5.288671E−01 | −3.514131E+00 | 9.812867E+00 |
| 6 | 4.908963E−01 | 2.866218E−02 | −2.696018E−01 | −1.316418E−01 | 1.628206E+00 |
| 7 | −2.353783E+01 | −6.353129E−02 | 1.728072E−01 | −2.006267E−01 | −1.838870E+00 |
| 8 | −2.470036E+01 | −9.593569E−02 | −1.872301E−01 | 4.660487E−01 | −1.043180E+00 |
| 9 | −1.000000E+02 | 4.407753E−01 | −9.715343E−01 | −4.921468E−01 | 1.531030E+00 |
| 10 | −3.642883E+00 | −8.089147E−02 | −3.099446E−01 | 2.725618E−01 | −2.089121E−02 |

| | A7 | A8 | A9 | A10 | A11 |
|---|---|---|---|---|---|
| 1 | 1.371866E+01 | −1.640953E+00 | −3.140004E+01 | 2.683785E+01 | 1.431645E+01 |
| 2 | −9.401848E+02 | 1.683809E+03 | −1.249430E+03 | −1.223736E+03 | 3.768591E+03 |
| 3 | 1.892021E+00 | −9.675105E−01 | 5.965462E+00 | −8.478562E+00 | −5.266888E+00 |

TABLE 16-continued

EXAMPLE 3 • ASPHERICAL SURFACE DATA

| | | | | | |
|---|---|---|---|---|---|
| 4 | 1.505682E+01 | −3.300338E+01 | 3.761169E+01 | 1.444386E+01 | −1.233830E+02 |
| 5 | −1.480589E+01 | 1.115340E+01 | −6.628563E+00 | 1.323780E+01 | −4.221589E+00 |
| 6 | −3.076479E+00 | 1.340115E−01 | 5.087009E+00 | −3.593778E+00 | −8.235401E−01 |
| 7 | 5.832008E+00 | −7.190315E+00 | 3.289741E+00 | −2.994957E−01 | 1.708640E+00 |
| 8 | 1.673514E+00 | −1.394303E+00 | 3.342968E−01 | 2.385688E−01 | −1.856918E−01 |
| 9 | −4.841791E−01 | −3.783911E−01 | 1.484580E−01 | −2.393333E−02 | 1.553440E−01 |
| 10 | −2.521836E−02 | −2.583110E−02 | 2.419778E−02 | −3.934506E−03 | −1.246208E−03 |

| | A12 | A13 | A14 | A15 | A16 |
|---|---|---|---|---|---|
| 1 | 9.175743E+00 | −6.455338E+01 | 2.705276E+01 | 3.234441E+01 | −2.075555E+01 |
| 2 | −3.312427E+03 | 4.917964E+02 | 1.218890E+03 | −8.787791E+02 | 1.915891E+02 |
| 3 | 1.830357E+01 | −5.259820E+00 | −1.514772E+01 | 1.466515E+01 | −4.048713E+00 |
| 4 | 1.919026E+02 | −1.425163E+02 | 4.633283E+01 | −5.986993E−01 | −2.136867E+00 |
| 5 | −4.146228E+01 | 6.888359E+01 | −3.946857E+01 | 4.510446E+00 | 1.989779E+00 |
| 6 | −5.379577E−01 | 7.221476E−01 | 3.592901E+00 | −4.012249E+00 | 1.148163E+00 |
| 7 | −2.623766E+00 | 8.737701E−01 | 4.870247E−01 | −3.988895E−01 | 7.810892E−02 |
| 8 | 9.306613E−02 | −6.387227E−02 | 2.946507E−02 | −6.681342E−03 | 6.129679E−04 |
| 9 | −1.113362E−01 | 1.921302E−03 | 2.135470E−02 | −7.425511E−03 | 7.927057E−04 |
| 10 | 8.429663E−05 | 1.748539E−04 | −2.118543E−05 | −5.400051E−06 | 7.090925E−07 |

TABLE 17

REFERENCE EXAMPLE 4 • ASPHERICAL SURFACE DATA

| SURF. No. | K | A3 | A4 | A5 | A6 |
|---|---|---|---|---|---|
| 1 | −1.436669E+01 | −1.643731E−01 | 2.510193E+00 | −4.564836E+00 | −3.897085E+00 |
| 2 | −5.862706E+01 | −8.307670E−02 | 2.929607E−01 | −3.654107E−01 | −6.996448E+00 |
| 3 | −9.565382E+01 | 1.840941E−01 | −1.927057E+00 | 3.909163E+00 | 2.781347E+00 |
| 4 | 6.802959E+00 | 2.353741E−02 | −3.190410E−01 | 3.947521E−01 | 1.424309E+00 |
| 5 | −1.000000E+02 | −1.066125E−01 | 7.893323E−01 | −4.111257E+00 | 8.835981E+00 |
| 6 | −2.118231E+00 | 2.909967E−02 | −5.217216E−01 | 4.063811E−01 | 4.704643E−01 |
| 7 | −9.955139E+01 | −8.726410E−02 | 3.255404E−01 | −2.325772E+00 | 3.826306E+00 |
| 8 | −1.114811E+01 | −3.898759E−01 | 2.713647E−01 | −9.117107E−01 | 1.611783E+00 |
| 9 | −3.441544E+01 | −2.846268E−01 | −9.109745E−01 | 5.067167E−01 | 2.024386E+00 |
| 10 | −3.357254E+00 | −4.692874E−02 | −1.034144E+00 | 1.429419E+00 | −2.864468E−01 |

| | A7 | A8 | A9 | A10 | A11 |
|---|---|---|---|---|---|
| 1 | 2.607618E+01 | −9.305732E+00 | −5.174355E+01 | −1.566856E+02 | 6.193036E+02 |
| 2 | 2.906349E+01 | −3.061609E+01 | −4.404007E+01 | 5.960479E+01 | 1.869575E+02 |
| 3 | −2.042502E+01 | 1.851999E+01 | 1.689347E+01 | 8.728048E+00 | −1.008291E+02 |
| 4 | −4.374988E−01 | −3.843137E+00 | −2.182955E+00 | 1.977573E+01 | −1.346331E+01 |
| 5 | −8.731394E+00 | −2.507977E+00 | 6.231097E+00 | 5.403228E+01 | −1.471925E+02 |
| 6 | −2.552477E+00 | 2.163162E+00 | 2.133724E+00 | −2.501237E−03 | −6.912358E+00 |
| 7 | −1.926074E+00 | −6.062681E−01 | −9.072461E+00 | 1.736395E+01 | 4.455570E+00 |
| 8 | −1.323085E+00 | 2.280075E−01 | 4.369786E−01 | −4.365082E−01 | 4.082838E−01 |
| 9 | −2.514032E+00 | 1.132650E+00 | −4.962632E−01 | 3.089339E−01 | 3.012862E−02 |
| 10 | −4.658423E−01 | 1.492197E−01 | −6.936613E−02 | 3.294725E−01 | −2.707669E−01 |

| | A12 | A13 | A14 | A15 | A16 |
|---|---|---|---|---|---|
| 1 | 7.521535E+01 | −2.377031E+03 | 3.322815E+03 | −1.599953E+03 | 1.374162E+02 |
| 2 | −3.572363E+02 | 4.738475E+01 | 1.932905E+02 | 3.919399E+00 | −8.798372E+01 |
| 3 | −2.437208E+00 | 2.841330E+02 | −2.964527E+02 | 6.670780E+01 | 2.028974E+01 |
| 4 | 4.235919E+00 | −6.049091E+01 | 1.081729E+02 | −5.289206E+01 | −1.891109E+02 |
| 5 | 7.960944E+01 | 1.522096E+02 | −2.332252E+02 | 1.062562E+02 | −1.210523E+01 |
| 6 | 7.599316E−01 | 7.466615E+00 | −5.497496E−01 | −4.910512E+00 | 1.900118E+00 |
| 7 | −2.972167E+01 | 1.792999E+01 | 1.373986E+00 | −1.030769E+00 | −1.057867E+00 |
| 8 | −2.642741E−01 | 1.349896E−01 | 6.677328E−02 | −2.871265E−02 | 3.671262E−03 |
| 9 | −1.364811E−01 | 3.456542E−02 | 1.735432E−02 | −9.582954E−03 | 1.278343E−03 |
| 10 | 4.006292E−02 | 4.069183E−02 | −2.007811E−02 | 3.043390E−03 | −8.587349E−05 |

TABLE 18

REFERENCE EXAMPLE 5 • ASPHERICAL SURFACE DATA

| SURF. No. | K | A3 | A4 | A5 | A6 |
|---|---|---|---|---|---|
| 1 | −1.441638E+01 | −8.739064E−02 | 1.555748E+00 | −2.164036E+00 | −6.403061E+00 |
| 2 | −3.904768E+01 | −2.224954E−02 | 2.386439E−02 | −1.289730E+00 | 8.308981E+00 |
| 3 | −9.547188E+01 | 9.875039E−02 | −1.241671E+00 | 2.710453E+00 | −4.390858E−02 |

TABLE 18-continued

REFERENCE EXAMPLE 5 • ASPHERICAL SURFACE DATA

| | | | | | |
|---|---|---|---|---|---|
| 4 | 4.466939E−01 | −1.206264E−02 | −2.114793E−01 | 2.686153E−01 | 2.361697E−01 |
| 5 | −1.000000E+02 | −8.554672E−02 | 1.011321E+00 | −4.835295E+00 | 1.141613E+01 |
| 6 | −8.779621E−01 | −4.564150E−02 | −6.684820E−02 | −3.606278E−01 | −1.488236E+00 |
| 7 | −9.990777E+01 | −2.353741E−01 | 1.474661E+00 | −5.433362E+00 | 7.395807E+00 |
| 8 | −1.810812E+01 | −2.834316E−01 | 1.145821E−01 | −9.815272E−01 | 1.981927E+00 |
| 9 | −1.000000E+02 | −6.617371E−02 | −9.394120E−01 | 3.391700E−01 | 8.437565E−01 |
| 10 | −3.979297E+00 | −1.327862E−01 | −6.131742E−01 | 7.847933E−01 | 9.560755E−02 |

| | A7 | A8 | A9 | A10 | A11 |
|---|---|---|---|---|---|
| 1 | 3.314293E+01 | −4.425444E+01 | −4.685604E+01 | 1.861627E+02 | −1.232015E+02 |
| 2 | −3.993506E+01 | 1.195673E+02 | −1.513063E+02 | −1.456995E+02 | 6.156889E+02 |
| 3 | −6.347519E+00 | 7.171692E+00 | −3.073092E−01 | 1.328844E+00 | −3.340729E+00 |
| 4 | 3.096785E+00 | −6.491687E+00 | −1.777564E−01 | 4.963728E+00 | 6.843116E+00 |
| 5 | −2.191649E+01 | 3.319479E+01 | −2.560644E+01 | 1.374430E+00 | 5.329029E+00 |
| 6 | 7.008981E+00 | −8.708310E+00 | −1.730556E+00 | 8.683239E+00 | 6.902688E+00 |
| 7 | −2.536867E+00 | −6.165792E−03 | −5.148086E+00 | −1.934186E+01 | 6.306440E+01 |
| 8 | −1.258735E+00 | −7.214628E−01 | 1.066437E+00 | −1.510721E−02 | −3.383538E−01 |
| 9 | 8.001546E−02 | −8.923115E−01 | 1.615613E−01 | 3.953759E−01 | −2.463757E−01 |
| 10 | −6.018356E−01 | 2.956873E−01 | −6.897989E−03 | −9.439484E−03 | −1.392311E−02 |

| | A12 | A13 | A14 | A15 | A16 |
|---|---|---|---|---|---|
| 1 | −1.469649E+02 | 4.157538E+02 | −7.183115E+02 | 7.878775E+02 | −3.457280E+02 |
| 2 | −1.611907E+02 | −1.523275E+03 | 2.498911E+03 | −1.582287E+03 | 3.593106E+02 |
| 3 | −2.080584E+01 | 2.808828E+01 | 2.360069E+01 | −4.997635E+01 | 1.865899E+01 |
| 4 | −4.361311E+00 | −2.206129E+01 | 2.633915E+01 | −4.494266E+00 | −4.195031E+00 |
| 5 | −1.748342E+01 | 4.656050E+01 | −1.589539E+01 | −3.386556E+01 | 2.083813E+01 |
| 6 | −1.911050E+01 | 4.249707E+00 | 6.931329E+00 | −3.680748E+01 | −1.923290E+00 |
| 7 | −2.874054E+01 | −6.493441E+01 | 8.301375E+01 | −3.197296E+01 | 2.876998E+00 |
| 8 | 2.185928E−01 | −1.933298E−01 | 1.220141E−01 | −3.376809E−02 | 3.160559E−03 |
| 9 | 4.647003E−02 | 1.060656E−02 | −1.269376E−02 | 4.917558E−03 | −6.898601E−04 |
| 10 | 9.838707E−03 | −6.080629E−03 | 3.699134E−03 | −1.180790E−03 | 1.420235E−04 |

TABLE 19

EXAMPLE 6 • ASPHERICAL SURFACE DATA

| SURF. No. | K | A3 | A4 | A5 | A6 |
|---|---|---|---|---|---|
| 1 | −1.439497E+01 | −1.522351E−01 | 2.530065E+00 | −4.886003E+00 | −5.586476E+00 |
| 2 | −5.910660E+01 | −1.367306E−02 | −1.448178E−01 | 1.387102E−01 | −3.418202E+00 |
| 3 | −9.576106E+01 | 1.590168E−01 | −1.226434E+00 | 2.456330E+00 | 4.298950E+00 |
| 4 | −9.719842E+01 | −6.177175E−03 | 3.989587E−02 | −2.005028E−01 | −1.436962E+00 |
| 5 | −1.000000E+02 | −6.007810E−02 | −1.150111E−01 | 3.553873E+00 | −4.040403E+01 |
| 6 | −1.674387E+00 | 1.359917E−04 | −2.708998E−01 | 1.765644E−01 | −4.102360E−01 |
| 7 | −9.907142E+01 | −1.153634E−01 | 6.104158E−01 | −2.065726E+00 | 1.147925E+00 |
| 8 | −1.333893E+00 | −2.218307E−01 | 6.360854E−01 | −1.892989E+00 | 2.012202E+00 |
| 9 | −2.489852E+00 | −9.527116E−02 | −7.501535E−01 | 1.218614E−01 | 8.818448E−01 |
| 10 | −3.230919E+00 | −1.818667E−02 | −1.072132E+00 | 1.289357E+00 | −4.115967E−02 |

| | A7 | A8 | A9 | A10 | A11 |
|---|---|---|---|---|---|
| 1 | 4.349420E+01 | −4.980148E+01 | −7.813273E+01 | 1.285909E+02 | 1.418956E+02 |
| 2 | 1.270926E+02 | −4.512719E+00 | −7.474799E+01 | 1.646848E+02 | −7.264455E+01 |
| 3 | −3.730001E+01 | 9.306175E+01 | −1.073186E+02 | 3.680282E+01 | 2.036540E+01 |
| 4 | 1.412806E+01 | −3.060161E+01 | 2.061864E+01 | −1.488954E+01 | 8.114764E+01 |
| 5 | 2.175380E+02 | −7.059860E+02 | 1.466715E+03 | −1.884564E+03 | 1.148360E+03 |
| 6 | 6.818631E−02 | 1.833538E+00 | −2.601649E+00 | 2.007743E+00 | −3.062667E+00 |
| 7 | 3.054980E+00 | −2.847058E+00 | −5.792833E+00 | 5.861461E+00 | 7.448167E+00 |
| 8 | −3.718152E−01 | −5.081616E−01 | −3.929090E−01 | 5.504190E−01 | 2.977853E−01 |
| 9 | −4.642769E−01 | −1.063049E−01 | −1.017719E−02 | 9.673394E−02 | 6.836916E−03 |
| 10 | −9.008145E−01 | 5.484549E−01 | 7.693670E−03 | −1.161177E−02 | −7.981033E−02 |

| | A12 | A13 | A14 | A15 | A16 |
|---|---|---|---|---|---|
| 1 | 1.008448E+02 | −1.323644E+03 | 1.578494E+03 | −2.963976E+02 | −2.614322E+02 |
| 2 | −9.478636E+01 | −3.061561E+00 | 1.588400E+02 | −5.265770E+01 | −3.603831E+01 |
| 3 | 1.062555E+02 | −4.435456E+02 | 7.058624E+02 | −5.491974E+02 | 1.696190E+02 |
| 4 | −6.387363E+01 | −1.642387E+02 | 2.526029E+02 | −5.721883E+01 | −3.878433E+01 |
| 5 | 5.749264E+02 | −1.924768E+03 | 1.885329E+03 | −9.428749E+02 | 2.023013E+02 |
| 6 | 1.650424E+00 | 3.774552E+00 | −4.081510E+00 | 3.421122E−01 | 4.745396E−01 |

TABLE 19-continued

| EXAMPLE 6 • ASPHERICAL SURFACE DATA | | | | | |
|---|---|---|---|---|---|
| 7 | −1.046745E+01 | −3.725869E−01 | 4.558104E+00 | −1.080530E+00 | −2.651182E−01 |
| 8 | −4.271170E−01 | 6.536531E−02 | 4.744471E−02 | −1.410695E−02 | 4.014132E−04 |
| 9 | −1.929143E−02 | −1.983456E−02 | 2.037958E−02 | −6.356670E−03 | 7.036268E−04 |
| 10 | 1.266760E−02 | 2.977022E−02 | −1.250706E−02 | 2.678482E−04 | 3.662063E−04 |

TABLE 20

| EXAMPLE 7 • ASPHERICAL SURFACE DATA | | | | | |
|---|---|---|---|---|---|
| SURF. No. | K | A3 | A4 | A5 | A6 |
| 1 | −1.439547E+01 | −1.525256E−01 | 2.504506E+00 | −4.426269E+00 | −7.568284E+00 |
| 2 | −5.936443E+01 | −1.127178E−02 | −4.371263E−01 | 4.679675E+00 | −3.791575E+01 |
| 3 | −9.736174E+01 | 1.576274E−01 | −1.268618E+00 | 3.307918E+00 | −2.806850E+00 |
| 4 | −9.622119E+01 | 3.702756E−03 | −4.453100E−02 | 3.590999E−01 | −4.421885E+00 |
| 5 | −1.000000E+02 | −7.259249E−02 | 4.354124E−01 | −3.838463E+00 | 1.289659E+01 |
| 6 | −7.365535E+00 | −4.254686E−03 | −2.453422E−01 | 1.148857E−01 | −3.058424E−01 |
| 7 | −1.000000E+02 | −1.106196E−01 | 6.000988E−01 | −1.782715E+00 | −4.902704E−01 |
| 8 | 2.682046E+00 | −2.023341E−01 | 6.854978E−01 | −1.897608E+00 | 1.642909E+00 |
| 9 | −2.471305E+01 | −7.712443E−02 | −7.482429E−01 | 1.193814E−01 | 8.007152E−01 |
| 10 | −3.230915E+00 | −9.051401E−03 | −1.044547E+00 | 1.152565E+00 | 2.530371E−01 |
| | A7 | A8 | A9 | A10 | A11 |
| 1 | 4.521587E+01 | −3.595831E+01 | −1.359493E+02 | 2.366034E+02 | 6.780112E+00 |
| 2 | 1.659349E+02 | −4.102980E+02 | 4.881121E+02 | 1.018672E+02 | −1.153361E+03 |
| 3 | −3.592338E+00 | −2.083847E+00 | 4.137336E+01 | −4.798988E+01 | −3.841059E+01 |
| 4 | 2.500975E+01 | −5.108086E+01 | 1.384272E+01 | 1.086505E+02 | −1.634553E+02 |
| 5 | −2.425015E+01 | 2.604932E+01 | −2.706153E+01 | 6.334243E+01 | −7.654971E+01 |
| 6 | −1.466998E−01 | 1.995023E+00 | −1.701473E+00 | −9.973092E−01 | 5.855898E−01 |
| 7 | 8.173265E+00 | −1.243342E+01 | 3.955680E+00 | 3.920507E+00 | 1.893139E−01 |
| 8 | 5.479518E−01 | −1.600192E+00 | 1.464350E−01 | 8.361371E−01 | −2.972608E−01 |
| 9 | −2.756789E−01 | −3.866615E−01 | 2.901204E−01 | −8.493520E−01 | 1.647565E−02 |
| 10 | −1.294354E+00 | 8.038341E−01 | 6.317951E−02 | −2.360916E−01 | 6.934742E−02 |
| | A12 | A13 | A14 | A15 | A16 |
| 1 | 3.162786E+02 | −1.765287E+03 | 2.196740E+03 | −7.557685E+02 | −1.223663E+02 |
| 2 | 1.387663E+03 | −1.657645E+02 | −1.185181E+03 | 1.206105E+03 | −4.075098E+02 |
| 3 | 6.047600E+01 | 7.344352E+01 | −1.210361E+02 | 2.129532E+02 | 1.722258E+01 |
| 4 | 5.412924E+01 | 1.059005E+02 | −2.456245E+02 | 2.779834E+02 | −1.241372E+02 |
| 5 | −7.600586E+01 | 2.926426E+02 | −2.870071E+02 | 1.092575E+02 | −9.939493E+00 |
| 6 | 1.050734E+00 | 1.691070E−01 | 3.873884E−01 | −1.909156E+00 | 9.051072E−01 |
| 7 | −2.680228E+00 | −1.637226E+00 | 1.754427E+00 | 9.126769E−01 | −6.907838E−01 |
| 8 | −1.287466E−01 | 1.072569E−01 | −6.233755E−02 | 3.154243E−02 | −6.133530E−03 |
| 9 | 5.743193E−02 | −8.486920E−02 | 4.745117E−02 | −1.237071E−02 | 1.272886E−03 |
| 10 | −6.777675E−03 | 3.242816E−03 | 3.861549E−03 | −3.665620E−03 | 7.275991E−04 |

TABLE 21

| EXAMPLE 8 • ASPHERICAL SURFACE DATA | | | | | |
|---|---|---|---|---|---|
| SURF. No. | K | A3 | A4 | A5 | A6 |
| 1 | −1.442361E+01 | −1.417476E−01 | 1.930876E+00 | 4.701402E+00 | −7.881646E+01 |
| 2 | −5.867919E+01 | −4.940549E−02 | 7.331254E−02 | 3.079250E−01 | −9.297929E+00 |
| 3 | −9.576421E+01 | 1.362916E−01 | −1.075192E+00 | 2.620195E+00 | −1.135105E+00 |
| 4 | −4.222207E+01 | −6.860096E−03 | 4.573389E−01 | −6.491101E+00 | 4.699633E+01 |
| 5 | −1.000000E+02 | −5.358603E−02 | 1.602139E−01 | −1.823088E+00 | 4.137646E−01 |
| 6 | −1.199554E+00 | 1.635403E−02 | −3.223304E−01 | −3.436985E−01 | 3.319908E+00 |
| 7 | −9.907141E+00 | −1.028078E−01 | 4.116866E−01 | −1.600276E+00 | 5.869905E−01 |
| 8 | −1.287636E+00 | −2.575173E−01 | 3.986190E−01 | −1.351660E+00 | 1.532748E+00 |
| 9 | −2.460981E+01 | −9.905982E−02 | −7.315905E−01 | 1.029652E−01 | 8.491910E−01 |
| 10 | −3.267205E+00 | −1.676536E−02 | −1.074221E+00 | 1.192672E+00 | 3.847055E−01 |
| | A7 | A8 | A9 | A10 | A11 |
| 1 | 3.498273E+02 | −6.784738E+02 | −1.432715E+02 | 3.780231E+03 | −8.537976E+03 |
| 2 | 4.050842E+01 | −7.723289E+01 | 5.842950E+01 | −3.791228E+01 | 2.064449E+02 |
| 3 | −5.263775E+00 | −1.161507E+01 | 1.044175E+02 | −2.239484E+02 | 1.898538E+02 |
| 4 | −2.059224E+02 | 5.930101E+02 | −1.094140E+03 | 1.252710E+03 | −1.096982E+03 |
| 5 | 2.472081E+01 | −9.171929E+01 | 1.390010E+02 | −5.116800E+01 | −5.353581E+01 |
| 6 | −1.127878E+01 | 2.004507E+01 | −1.545950E+01 | −3.715349E+00 | 1.618057E+01 |

TABLE 21-continued

| EXAMPLE 8 • ASPHERICAL SURFACE DATA | | | | | |
|---|---|---|---|---|---|
| 7 | 3.290345E+00 | −1.679426E+00 | −1.145502E+01 | 1.755829E+01 | −4.036899E+00 |
| 8 | −9.354857E−02 | −9.206126E−01 | 3.889499E−02 | 7.022462E−01 | −3.636650E−01 |
| 9 | −3.193819E−01 | −3.236584E−01 | 1.733950E−01 | −3.282558E−02 | 9.691806E−02 |
| 10 | −1.640842E+00 | 1.184247E+00 | −1.808952E−01 | −1.461521E−01 | 4.956094E−02 |

| | A12 | A13 | A14 | A15 | A16 |
|---|---|---|---|---|---|
| 1 | 7.864817E+03 | 1.264541E+03 | −1.033300E+04 | 9.636048E+03 | −3.162219E+03 |
| 2 | −4.485630E+02 | 4.176123E+02 | −2.590493E+02 | 2.113394E+02 | −1.082296E+02 |
| 3 | 5.647075E+01 | −3.275248E+02 | 4.160830E+02 | −2.804445E+02 | 8.151696E+01 |
| 4 | 1.776977E+03 | −3.483617E+03 | 3.982668E+03 | −2.270320E+03 | 5.025312E+02 |
| 5 | −1.704712E+02 | 6.214134E+02 | −7.063890E+02 | 3.565326E+02 | −6.722257E+01 |
| 6 | −8.749293E+00 | −9.441373E+00 | 2.154563E+01 | −1.639741E+01 | 4.495312E+00 |
| 7 | −7.514073E+00 | 4.241759E+00 | −5.395347E−01 | 1.152777E+00 | −6.717077E−01 |
| 8 | 1.147842E−01 | −1.372660E−01 | 8.470734E−02 | −1.837585E−02 | 9.343723E−04 |
| 9 | −6.520019E−02 | −5.765521E−03 | 1.749040E−02 | −5.775094E−03 | 6.237463E−04 |
| 10 | 6.505861E−03 | −9.864886E−03 | 9.957421E−03 | −4.953843E−03 | 8.266855E−04 |

TABLE 22

| EXAMPLE 9 • ASPHERICAL SURFACE DATA | | | | | |
|---|---|---|---|---|---|
| SURF. No. | K | A3 | A4 | A5 | A6 |
| 1 | −1.439531E+01 | −1.549105E−01 | 2.516657E+00 | −4.610526E+00 | −7.658608E+00 |
| 2 | −5.910614E+01 | −8.096418E−03 | −2.208132E−01 | 5.253216E−01 | −6.427605E+00 |
| 3 | −9.576106E+01 | 1.736682E−01 | −1.374969E+00 | 2.968843E+00 | 1.526129E+00 |
| 4 | −9.719172E+01 | −1.329968E−03 | −2.476323E−02 | 4.579272E−01 | −5.673072E+00 |
| 5 | −1.000000E+02 | −9.374055E−02 | 7.792031E−01 | −5.401263E+00 | 2.186160E+01 |
| 6 | −1.668029E+00 | −1.903422E−02 | −1.806260E−01 | 1.500962E−02 | −4.550053E−01 |
| 7 | −9.907141E+01 | −1.323604E−01 | 6.315344E−01 | −1.856786E+00 | −3.193111E−01 |
| 8 | −1.340369E+00 | −2.262113E−01 | 6.165743E−01 | −1.603672E+00 | 6.362757E−01 |
| 9 | −2.489066E+00 | −1.011185E−01 | −7.893648E−01 | 1.663273E−01 | 8.617818E−01 |
| 10 | −3.230755E+00 | −1.245791E−02 | −1.069834E+00 | 1.242234E+00 | 6.291200E−02 |

| | A7 | A8 | A9 | A10 | A11 |
|---|---|---|---|---|---|
| 1 | 4.847644E+01 | −3.951528E+01 | −1.651931E+02 | 3.315568E+02 | −3.581140E+01 |
| 2 | 2.992217E+01 | −6.272550E+01 | 3.819470E+01 | 5.345031E+01 | −5.361575E+01 |
| 3 | −2.268597E+01 | 4.514225E+01 | −2.338456E+01 | −1.772995E+00 | 8.446532E+00 |
| 4 | 3.187306E+01 | −7.571190E+01 | 7.628824E+01 | −4.013509E+00 | −2.819707E+01 |
| 5 | −6.083833E+01 | 1.047017E+02 | −6.779014E+01 | −1.345576E+00 | 4.017084E+02 |
| 6 | 9.626053E−01 | 7.135193E−01 | −2.825100E+00 | 1.968162E+00 | −8.893913E−01 |
| 7 | 7.589483E+00 | −1.072843E+01 | 2.184233E+00 | 3.263896E+00 | 2.496819E+00 |
| 8 | 2.835424E+00 | −4.544923E+00 | 2.172949E+00 | 3.308228E−01 | −5.138382E−01 |
| 9 | −2.813708E−01 | −4.811128E−01 | 3.857302E−01 | −2.079581E−01 | 1.828829E−01 |
| 10 | −9.899509E−01 | 5.270867E−01 | 1.281210E−01 | −1.103691E−01 | −7.123066E−02 |

| | A12 | A13 | A14 | A15 | A16 |
|---|---|---|---|---|---|
| 1 | −8.892996E+00 | −9.016622E+02 | 1.134320E+03 | −6.015049E+01 | −3.180141E+02 |
| 2 | −4.883375E+01 | 2.667753E+01 | 2.181798E+01 | 7.031752E+01 | −7.512355E+01 |
| 3 | −2.284287E+01 | 9.425677E+01 | −4.502455E+01 | −6.841802E+01 | 4.908859E+01 |
| 4 | −3.457361E+01 | 1.044787E+02 | −1.898508E+02 | 2.328448E+02 | −1.104639E+02 |
| 5 | −4.284897E+02 | 8.298371E+01 | 2.796693E+02 | −2.803456E+02 | 8.576106E+01 |
| 6 | 2.350806E+00 | −3.004220E+00 | 2.291360E+00 | −1.515136E+00 | 4.942876E−01 |
| 7 | −3.491247E+00 | −2.765618E+00 | 3.222558E+00 | 6.534006E−02 | −4.762823E−01 |
| 8 | −3.939283E−02 | 2.461972E−01 | −1.968834E−01 | 7.863347E−02 | −1.227384E−02 |
| 9 | −8.385791E−02 | −9.388243E−03 | 2.152369E−02 | −7.069548E−03 | 7.854688E−04 |
| 10 | 5.261483E−02 | −2.539471E−03 | −1.671994E−04 | −2.228216E−03 | 5.834574E−04 |

TABLE 23

| EXAMPLE 10 • ASPHERICAL SURFACE DATA | | | | | |
|---|---|---|---|---|---|
| SURF. No. | K | A3 | A4 | A5 | A6 |
| 1 | −1.507395E+01 | −1.534672E−01 | 2.526870E+00 | −3.887256E+00 | −1.444564E+01 |
| 2 | −7.197552E+01 | −2.538779E−02 | −6.459565E−02 | 4.179804E−02 | −5.180732E+00 |
| 3 | −1.000000E+02 | 1.628978E−01 | −1.328373E+00 | 3.745222E+00 | −5.235524E+00 |
| 4 | −7.061622E+01 | 1.064169E−02 | 8.847733E−03 | −1.538067E+00 | 1.216321E+01 |
| 5 | −1.000000E+02 | −6.138045E−02 | 3.177056E−01 | −3.092129E+00 | 1.084070E+01 |
| 6 | 9.419241E+00 | −5.808133E−03 | −2.815698E−01 | 1.990190E−01 | −4.055469E−01 |

TABLE 23-continued

EXAMPLE 10 • ASPHERICAL SURFACE DATA

|   |   |   |   |   |   |
|---|---|---|---|---|---|
| 7 | −1.000000E+02 | −1.363492E−01 | 5.148190E−01 | −1.451503E+00 | −1.360590E+00 |
| 8 | −3.225126E+00 | −2.720893E−01 | 4.360839E−01 | −1.583060E+00 | 2.395004E+00 |
| 9 | −2.031373E+01 | −1.242224E−01 | −9.522506E−01 | 1.273787E+00 | −2.430611E+00 |
| 10 | −3.865734E+00 | −5.408060E−02 | −9.788903E−01 | 1.190745E+00 | 2.136280E−01 |

|   | A7 | A8 | A9 | A10 | A11 |
|---|---|---|---|---|---|
| 1 | 8.184706E+01 | −1.467434E+02 | 6.208389E+01 | 3.873829E+01 | 1.498668E+02 |
| 2 | 2.521790E+01 | −4.610011E+01 | 3.350164E+00 | 8.678185E+01 | −4.584010E+01 |
| 3 | 5.945639E+00 | −2.611720E+01 | 7.310445E+01 | −5.553873E+01 | −4.097839E+01 |
| 4 | −5.093225E+01 | 1.447170E+02 | −2.188520E+02 | −2.573003E+01 | 7.077451E+02 |
| 5 | −2.296575E+01 | 3.583620E+01 | −6.037254E+01 | 1.078863E+02 | −9.291811E+01 |
| 6 | 3.176083E−01 | 4.573646E−01 | 6.216248E−01 | −2.732622E+00 | 1.592401E+00 |
| 7 | 9.599971E+00 | −1.231232E+01 | −2.741867E−02 | 8.118119E+00 | 2.853722E+00 |
| 8 | −1.648287E+00 | 6.983502E−01 | −8.143481E−01 | 5.211727E−01 | 2.066527E−01 |
| 9 | 5.534694E+00 | −6.567696E+00 | 3.081267E+00 | 1.296194E+00 | −2.594897E+00 |
| 10 | −1.485665E+00 | 1.177577E+00 | −2.607392E−01 | −4.652923E−02 | −3.187292E−02 |

|   | A12 | A13 | A14 | A15 | A16 |
|---|---|---|---|---|---|
| 1 | −6.780843E+01 | −6.819557E+02 | 6.421771E+02 | 3.577501E+02 | −4.447776E+02 |
| 2 | −9.670282E+01 | 5.410483E+01 | 5.305911E+01 | 1.998359E+01 | −5.429208E+01 |
| 3 | −7.709809E+01 | 4.731816E+02 | −6.051098E+02 | 3.032066E+02 | −4.788313E+01 |
| 4 | −1.080884E+03 | 4.224049E+02 | 4.378696E+02 | −4.550432E+02 | 1.059084E+02 |
| 5 | −1.002614E+02 | 3.247787E+02 | −3.059453E+02 | 1.197709E+02 | −1.394117E+01 |
| 6 | −3.308032E−01 | 1.923694E+00 | −8.761972E−01 | −1.391373E+00 | 8.062039E−01 |
| 7 | −1.271215E+01 | 9.640566E+00 | −5.722880E+00 | 3.884504E+00 | −1.226436E+00 |
| 8 | −8.101362E−02 | −3.219551E−01 | 2.738288E−01 | −8.325587E−02 | 9.075355E−03 |
| 9 | 1.388881E+00 | −1.962671E−01 | −1.170228E−01 | 5.585644E−02 | −7.351383E−03 |
| 10 | 4.416190E−02 | −1.595189E−02 | 8.409460E−03 | −4.272144E−03 | 7.648913E−04 |

TABLE 24

EXAMPLE 11 • ASPHERICAL SURFACE DATA

| SURF. No. | K | A3 | A4 | A5 | A6 |
|---|---|---|---|---|---|
| 1 | −1.443830E+01 | −1.449695E−01 | 2.463161E+00 | −4.359913E+00 | −8.561718E+00 |
| 2 | −5.759100E+01 | −3.995884E−03 | −1.880932E−01 | 5.196549E−01 | −7.028975E+00 |
| 3 | −9.597693E+01 | 1.556530E−01 | −1.202377E+00 | 2.885560E+00 | −9.899375E−01 |
| 4 | −9.630262E+01 | 1.087485E−02 | −4.910389E−02 | 4.358986E−01 | −3.936021E+00 |
| 5 | −9.999951E+01 | −5.343668E−02 | 2.275548E−01 | −2.974025E+00 | 9.975586E+00 |
| 6 | 6.541408E+00 | 2.240933E−03 | −2.768997E−01 | 4.626220E−02 | 1.734342E−01 |
| 7 | 2.975428E+01 | −7.870457E−02 | 3.462283E−01 | −1.250462E+00 | −1.107656E−01 |
| 8 | −1.244858E+00 | −2.041956E−01 | 6.518433E−01 | −1.832778E+00 | 1.808640E+00 |
| 9 | −2.408865E+01 | −8.495801E−02 | −7.169461E−01 | 2.228775E−01 | 6.253773E−01 |
| 10 | −3.336227E+00 | −1.428885E−02 | −9.319354E−01 | 1.118964E+00 | −1.317839E−01 |

|   | A7 | A8 | A9 | A10 | A11 |
|---|---|---|---|---|---|
| 1 | 5.590193E+01 | −8.684711E+01 | 5.541698E+00 | −3.058074E+01 | 4.056915E+02 |
| 2 | 3.590804E+01 | −9.189444E+01 | 1.265224E+02 | −1.226590E+02 | 1.751737E+02 |
| 3 | −9.898230E+00 | 1.596716E+01 | 7.477058E+00 | −1.736373E+01 | −3.408977E+01 |
| 4 | 2.259833E+01 | −5.073178E+01 | 3.190638E+01 | 6.195504E+01 | −1.392269E+02 |
| 5 | −1.364344E+01 | −6.825732E+00 | 3.811244E+01 | −2.006287E+00 | −7.819252E+01 |
| 6 | −2.501107E−01 | 2.414866E−01 | 3.051234E−01 | −1.890273E−01 | −7.466109E−01 |
| 7 | 4.104218E+00 | −4.880691E+00 | −7.989201E+00 | 3.025261E+00 | 7.251535E+00 |
| 8 | −4.798017E−01 | 2.534555E−02 | −6.468381E−01 | 3.423032E−01 | 4.473154E−01 |
| 9 | −7.123045E−02 | −5.799283E−01 | 3.306910E−01 | 1.405440E−02 | −3.838028E−02 |
| 10 | −5.418514E−01 | 2.840681E−01 | 5.935870E−02 | −3.395481E−02 | −4.244524E−02 |

|   | A12 | A13 | A14 | A15 | A16 |
|---|---|---|---|---|---|
| 1 | −2.297156E+02 | −1.084862E+03 | 1.547386E+03 | −3.704106E+02 | −2.256637E+02 |
| 2 | −2.174047E+02 | 3.411973E+01 | 1.436898E+02 | −4.380704E+01 | −3.888860E+01 |
| 3 | 1.988128E+01 | 1.262407E+02 | −1.710790E+02 | 5.592293E+01 | 6.133369E+00 |
| 4 | 1.672090E+02 | −1.806379E+02 | 6.396356E+01 | 1.121877E+02 | −8.857460E+01 |
| 5 | 1.153358E+01 | 1.766011E+02 | −2.020730E+02 | 7.049988E+01 | −1.319739E+00 |
| 6 | −1.777592E−01 | 1.519739E+00 | 3.408776E−01 | −1.873220E+00 | 7.873783E−01 |
| 7 | 4.156784E−01 | −5.277788E+00 | 4.474558E+00 | −8.789421E−01 | −1.422229E−01 |
| 8 | −3.783311E−01 | −4.755075E−03 | 8.063933E−02 | −2.541982E−02 | 2.326972E−03 |
| 9 | −4.477606E−03 | 4.529639E−03 | 9.671815E−04 | −7.480027E−04 | 9.865354E−05 |
| 10 | 1.309107E−02 | 1.174467E−02 | −5.227916E−03 | −9.563915E−05 | 2.040594E−04 |

TABLE 25

EXAMPLE 12 • ASPHERICAL SURFACE DATA

| SURF. No. | K | A3 | A4 | A5 | A6 |
|---|---|---|---|---|---|
| 1 | −1.441825E+01 | −1.450733E−01 | 2.471670E+00 | −4.358927E+00 | −8.504181E+00 |
| 2 | −4.905683E+01 | −1.041072E−02 | −1.524455E−01 | 1.871896E−01 | −4.786506E+00 |
| 3 | −9.600848E+01 | 1.465411E−01 | −1.190462E+00 | 2.861973E+00 | −1.190338E+00 |
| 4 | −9.533868E+01 | 1.518583E−02 | −6.833727E−02 | 4.531852E−01 | −2.976987E+00 |
| 5 | −9.971459E+01 | −5.261169E−02 | 4.027784E−01 | −5.365932E+00 | 2.578051E+01 |
| 6 | 5.465437E+00 | 9.893507E−04 | −2.379132E−01 | 1.036263E−03 | 1.148352E−01 |
| 7 | 3.241535E+01 | −7.685555E−02 | 3.749233E−01 | −1.253433E+00 | −3.079996E−01 |
| 8 | −7.020246E+00 | −2.095418E−01 | 5.913107E−01 | −1.563839E+00 | 1.008567E+00 |
| 9 | −1.795780E+01 | −9.930902E−02 | −7.375073E−01 | 1.545600E−01 | 9.765592E−01 |
| 10 | −3.350715E+00 | −1.162616E−02 | −1.043532E+00 | 1.594285E+00 | −1.293697E+00 |

| | A7 | A8 | A9 | A10 | A11 |
|---|---|---|---|---|---|
| 1 | 5.450459E+01 | −7.728801E+01 | −3.279873E+01 | 6.147447E+01 | 3.096342E+02 |
| 2 | 2.349246E+01 | −4.332961E+01 | 3.955245E+00 | 6.119897E+01 | 4.525745E+01 |
| 3 | −9.081076E+00 | 1.409629E+01 | 1.053766E+01 | −1.917506E+01 | −4.182533E+01 |
| 4 | 1.653965E+01 | −3.680605E+01 | 2.715184E+01 | 1.430101E+01 | −1.488807E+01 |
| 5 | −7.324063E+01 | 1.194997E+02 | −7.801752E+01 | −5.722192E+01 | 4.633392E+01 |
| 6 | −5.885516E−02 | 1.707624E−01 | −1.084722E−01 | 4.206222E−01 | −5.628731E−01 |
| 7 | 4.773651E+00 | −6.042804E+00 | 5.564443E−01 | 1.489087E+00 | 2.628362E+00 |
| 8 | 1.306527E+00 | −2.589049E+00 | 1.693913E+00 | −7.608630E−01 | 5.010085E−01 |
| 9 | −6.721571E−01 | −7.718384E−03 | 4.815336E−03 | 9.445585E−02 | −9.088806E−03 |
| 10 | 1.296713E+00 | −1.547821E+00 | 1.075566E+00 | −1.952283E−01 | −1.768606E−01 |

| | A12 | A13 | A14 | A15 | A16 |
|---|---|---|---|---|---|
| 1 | −3.348352E+02 | −6.014338E+02 | 8.813292E+02 | 6.613049E+01 | −3.405696E+02 |
| 2 | −2.380866E+02 | 1.240580E+02 | 1.172569E+02 | −6.980956E+01 | −2.520582E+01 |
| 3 | 5.373235E+01 | 5.840924E+01 | −9.900748E+01 | 1.794723E+01 | 1.376913E+01 |
| 4 | 2.465279E+01 | −1.302120E+02 | 1.301712E+02 | 2.818146E+01 | −5.924816E+01 |
| 5 | 3.771464E+02 | −9.914015E+02 | 1.152616E+03 | −6.844886E+02 | 1.679169E+02 |
| 6 | −1.521967E+00 | 3.132160E+00 | −4.791501E−01 | −1.795124E+00 | 8.353776E−01 |
| 7 | −1.455799E+00 | −3.928813E+00 | 3.626413E+00 | −4.513414E−01 | −2.449808E−01 |
| 8 | −1.736383E−01 | −6.873582E−02 | 5.711576E−02 | −8.406850E−03 | −4.360939E−04 |
| 9 | −2.454432E−02 | −4.975405E−03 | 1.297955E−02 | −4.807623E−03 | 5.767315E−04 |
| 10 | 7.669889E−02 | 2.261067E−02 | −2.010830E−02 | 4.007529E−03 | −1.858104E−04 |

TABLE 26

EXAMPLE 13 • ASPHERICAL SURFACE DATA

| SURF. No. | K | A3 | A4 | A5 | A6 |
|---|---|---|---|---|---|
| 1 | −1.444106E+01 | 8.797736E−01 | −8.029745E−01 | 5.539786E−01 | −3.697505E−01 |
| 2 | −5.146902E+01 | −6.742429E−03 | −2.726959E−01 | 1.972649E+00 | −1.742661E+01 |
| 3 | −9.597838E+01 | 1.454838E−01 | −1.082022E+00 | 1.485963E+00 | 8.393109E+00 |
| 4 | −9.637950E+01 | 1.630084E−02 | −6.615523E−02 | 4.685752E−01 | −3.123389E+00 |
| 5 | −9.998926E+01 | −4.692466E−02 | 2.784099E−01 | −4.033004E+00 | 1.736372E+01 |
| 6 | 6.699423E+00 | 2.055372E−03 | −2.706140E−01 | 1.099414E−01 | −1.654653E−01 |
| 7 | 2.981249E+01 | −1.029565E−01 | 4.841873E−01 | −2.236856E+00 | 4.282581E+00 |
| 8 | −1.250787E+00 | −2.768630E−01 | 5.245958E−01 | −1.472736E+00 | 1.545636E+00 |
| 9 | −2.388566E+01 | −1.656376E−01 | −6.431500E−01 | 2.999476E−01 | 4.735470E−01 |
| 10 | −3.351920E+00 | −4.441582E−02 | −9.680454E−01 | 1.379603E+00 | −6.895429E−01 |

| | A7 | A8 | A9 | A10 | A11 |
|---|---|---|---|---|---|
| 1 | 1.454860E−01 | −6.969746E−02 | 1.543629E−03 | −5.718482E−03 | −1.103656E−02 |
| 2 | 7.041088E+00 | −1.115577E+02 | −1.327080E+02 | 8.654824E+02 | −1.390749E+03 |
| 3 | −4.765795E+01 | 1.022380E+02 | −7.272555E+01 | −1.226945E+02 | 3.632793E+02 |
| 4 | 1.703028E+01 | −3.688527E+01 | 2.530852E+01 | 8.629127E+01 | 3.210185E+01 |
| 5 | −4.157499E+01 | 5.025200E+01 | 1.361025E+00 | −1.029320E+02 | 1.730703E+02 |
| 6 | 7.825237E−01 | −1.901982E+00 | 3.053894E+00 | −2.633452E+00 | 3.051418E+00 |
| 7 | −7.423508E+00 | 1.146618E+01 | −5.321894E+00 | −2.230574E+01 | 4.516682E+01 |
| 8 | −3.055836E−01 | −4.297516E−01 | −9.998226E−02 | 3.144702E−01 | −3.368542E−02 |
| 9 | −4.322051E−02 | −4.839429E−01 | 2.283176E−01 | 7.395308E−01 | −4.912083E−02 |
| 10 | 2.711125E−01 | −5.566163E−01 | 5.810392E−01 | −1.557045E−01 | −8.826583E−02 |

| | A12 | A13 | A14 | A15 | A16 |
|---|---|---|---|---|---|
| 1 | 4.477410E−04 | −3.557295E−03 | −2.660895E−03 | 7.764030E−04 | −1.178693E−03 |
| 2 | 4.699277E+02 | 1.590708E+03 | −2.707282E+03 | 1.898395E+03 | −5.435858E+02 |
| 3 | −3.939605E+02 | 1.245530E+02 | 2.027147E+02 | −2.555746E+02 | 9.098587E+01 |
| 4 | −9.437424E+01 | 3.302602E+01 | −1.405967E+00 | 8.704511E+01 | −7.047269E+01 |

TABLE 26-continued

| EXAMPLE 13 • ASPHERICAL SURFACE DATA | | | | | |
|---|---|---|---|---|---|
| 5 | −1.327375E+02 | −3.824694E+01 | 2.129962E+02 | −1.999067E+02 | 6.404136E+01 |
| 6 | −8.778755E+00 | 1.359164E+01 | −8.841204E+00 | 1.652921E+00 | 2.561350E−01 |
| 7 | −2.836231E+01 | −6.167848E+00 | 1.664632E+01 | −7.492470E+00 | 1.038193E+00 |
| 8 | 8.467444E−02 | −2.056189E−01 | 1.234488E−01 | −2.880555E−02 | 2.235305E−03 |
| 9 | −2.985849E−02 | 3.273820E−02 | −1.224830E−02 | 2.282178E−03 | −1.806040E−04 |
| 10 | 4.013404E−02 | 1.694756E−02 | −1.203265E−02 | 1.725345E−03 | 3.847414E−05 |

TABLE 27

| | | VALUES OF CONDITIONAL EXPRESSIONS | | | | | |
|---|---|---|---|---|---|---|---|
| | EXP. No. | EXAMPLE 1 | EXAMPLE 2 | EXAMPLE 3 | REF. EXAMPLE 4 | REF. EXAMPLE 5 | EXAMPLE 6 | EXAMPLE 7 |
| ν d2 | (1) | 23.63 | 23.63 | 23.63 | 23.63 | 23.63 | 23.63 | 23.63 |
| f3/f1 | (2) | 14.82 | 18.16 | 8.71 | 3.85 | 2.98 | 8.88 | 10.57 |
| |f4/f5| | (3) | 2.32 | 1.16 | 8.73 | 3.81 | 3.98 | 5.11 | 13.06 |
| ν d4 | (4) | 23.63 | 23.63 | 23.63 | 55.89 | 55.89 | 23.63 | 23.63 |
| Fno | | 2.36 | 2.36 | 2.36 | 2.78 | 2.78 | 2.78 | 2.78 |
| f | | 4.18 | 4.16 | 4.19 | 3.72 | 3.74 | 3.72 | 3.73 |

| | EXP. No. | EXAMPLE 8 | EXAMPLE 9 | EXAMPLE 10 | EXAMPLE 11 | EXAMPLE 12 | EXAMPLE 13 |
|---|---|---|---|---|---|---|---|
| ν d2 | (1) | 23.63 | 23.63 | 23.63 | 23.63 | 23.63 | 23.63 |
| f3/f1 | (2) | 16.94 | 6.32 | 10.13 | 9.64 | 8.27 | 9.20 |
| |f4/f5| | (3) | 1.40 | 12.49 | 1.80 | 39.96 | 6.73 | 2.25 |
| ν d4 | (4) | 23.63 | 23.63 | 23.63 | 23.63 | 23.63 | 23.63 |
| Fno | | 2.78 | 2.78 | 2.78 | 2.78 | 2.78 | 2.78 |
| f | | 3.72 | 3.72 | 3.72 | 3.72 | 3.72 | 3.72 |

What is claimed is:

1. An image capturing lens substantially consisting of five lenses, composed of:
   a first lens is a meniscus lens having a convex surface on the object side near an optical axis and a positive refractive power near the optical axis with an aspherical shape on at least one surface;
   a second lens having a concave surface on the image side near the optical axis and a negative refractive power near the optical axis with an aspherical shape on at least one surface;
   a third lens having a positive refractive power near the optical axis with an aspherical shape on at least one surface;
   a fourth lens having an aspherical shape on at least one surface; and
   a fifth lens which is a meniscus lens having a concave surface on the image side near the optical axis and a negative refractive power near the optical axis with an aspherical shape on at least one surface, arranged in this order from the object side,
   wherein the image capturing lens is configured to satisfy conditional expressions given below:

$$2 < f3/f1 < 20 \quad (2);$$

$$1.10 < |f4/f5| \quad (3); \text{ and}$$

$$\nu d4 < 35 \quad (4),$$

$$\nu d2 < 35 \quad (1)$$

where:
   νd2 is an Abbe number of the second lens with respect to the d-line
   νd4 is an Abbe number of the fourth lens with respect to the d-line;
   f1 is a focal length of the first lens;
   f3 is a focal length of the third lens;
   f4 is a focal length of the fourth lens; and
   f5 is a focal length of the fifth lens.

2. The image capturing lens of claim 1, wherein an aperture stop is disposed on the object side of the first lens.

3. The image capturing lens of claim 1, further satisfying a conditional expression given below:

$$2.2 < f3/f1 < 20 \quad (2\text{-}1).$$

4. The image capturing lens of claim 1, further satisfying a conditional expression given below:

$$1.1 < |f4/f5| < 50 \quad (3\text{-}1).$$

5. The image capturing lens of claim 1, further satisfying a conditional expression given below:

$$\nu d4 < 30 \quad (4\text{-}1).$$

6. The image capturing lens of claim 1, further satisfying a conditional expression given below:

$$\nu d2 < 30 \quad (1\text{-}1),$$

where, νd2 is an Abbe number of the second lens with respect to the d-line.

7. An image capturing apparatus provided with the image capturing lens of claim 1.

* * * * *